(12) United States Patent
Linsky et al.

(10) Patent No.: US 7,684,464 B2
(45) Date of Patent: Mar. 23, 2010

(54) METHOD AND APPARATUS FOR PERFORMING CHANNEL ASSESSMENT IN A WIRELESS COMMUNICATION SYSTEM

(75) Inventors: Joel Linsky, San Diego, CA (US); Brian Miller, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1031 days.

(21) Appl. No.: 11/018,126

(22) Filed: Dec. 21, 2004

(65) Prior Publication Data
US 2006/0133543 A1 Jun. 22, 2006

(51) Int. Cl.
H04B 1/00 (2006.01)
H03K 9/00 (2006.01)
H04L 27/00 (2006.01)

(52) U.S. Cl. .................. 375/132; 375/130; 375/136; 375/316

(58) Field of Classification Search .......... 375/132, 375/133–150, 295, 296, 130, 316; 455/552.1
See application file for complete search history.

(56) References Cited

U.S. PATENT DOCUMENTS

| | | | | |
|---|---|---|---|---|
| 4,398,296 A | * | 8/1983 | Gott et al. | 375/133 |
| 5,448,750 A | * | 9/1995 | Eriksson et al. | 455/452.2 |
| 5,541,954 A | * | 7/1996 | Emi | 375/133 |
| 5,737,359 A | * | 4/1998 | Koivu | 375/133 |
| 5,809,059 A | * | 9/1998 | Souissi et al. | 375/133 |
| 5,857,143 A | * | 1/1999 | Kataoka | 455/62 |
| 6,084,919 A | * | 7/2000 | Kleider et al. | 375/285 |
| 6,115,407 A | * | 9/2000 | Gendel et al. | 375/132 |
| 6,118,805 A | * | 9/2000 | Bergstrom et al. | 375/132 |
| 6,240,125 B1 | * | 5/2001 | Andersson et al. | 375/132 |

(Continued)

FOREIGN PATENT DOCUMENTS

KR 100331752 3/2002

(Continued)

OTHER PUBLICATIONS

"Bluetooth Specification Version 1.1" published Feb. 22, 2001; Section 1, pp. 41-42; Section 2.1, p. 43; Section 4.1-2, pp. 47-50; Section 10.9, p. 120; and Section 11, pp. 126-137.

(Continued)

Primary Examiner—Temesghen Ghebretinsae
(74) Attorney, Agent, or Firm—Donald C. Kordich

(57) ABSTRACT

A system and method for classifying channels in a frequency hopping wireless communication system is provided. A data collection engine operates to obtain channel metrics indicating the level of interference for each channel used by the wireless communication system. A data analysis engine operates to provide a channel map for adaptive frequency hopping (AFH) and/or a channel map for channel avoidance. More specifically, the data analysis engine first operates to filter the channel metrics to remove channel metrics indicative of frequency hopping interference. Next, the channels are divided into a number of channel blocks each including at least two adjacent channels. For each channel block, the channel metrics of the channels within the channel block are combined to provide a metric sum. The data analysis engine then operates to classify each channel as usable or unusable based on the metric sums for each of the channel blocks.

51 Claims, 8 Drawing Sheets

U.S. PATENT DOCUMENTS

| | | | |
|---|---|---|---|
| 6,355,537 B1 | 3/2002 | Seefeldt | 438/405 |
| 6,366,622 B1 | 4/2002 | Brown et al. | 375/322 |
| 6,466,797 B1 | 10/2002 | Frodigh et al. | |
| 6,480,721 B1* | 11/2002 | Sydon et al. | 455/464 |
| 6,526,264 B2 | 2/2003 | Sugar et al. | |
| 6,560,443 B1 | 5/2003 | Vaisanen et al. | |
| 6,570,446 B1 | 5/2003 | Ling | 330/252 |
| 6,577,670 B1* | 6/2003 | Roberts | 375/133 |
| 6,647,053 B1* | 11/2003 | Garces | 375/132 |
| 6,647,077 B1 | 11/2003 | Shan et al. | 375/346 |
| 6,651,207 B1* | 11/2003 | Dicker et al. | 714/746 |
| 6,657,987 B1 | 12/2003 | Kumar et al. | |
| 6,661,834 B1 | 12/2003 | Shan et al. | 375/147 |
| 6,670,914 B1 | 12/2003 | Najarian et al. | 342/357.06 |
| 6,674,818 B1 | 1/2004 | King et al. | 375/343 |
| 6,680,652 B2 | 1/2004 | Hoheisel et al. | 330/302 |
| 6,681,261 B2 | 1/2004 | Mancusi et al. | |
| 6,687,239 B1* | 2/2004 | Koprivica | 370/341 |
| 6,693,468 B2 | 2/2004 | Humphreys et al. | 327/105 |
| 6,693,954 B1 | 2/2004 | King et al. | 375/147 |
| 6,700,929 B1 | 3/2004 | Shan et al. | 375/224 |
| 6,704,293 B1 | 3/2004 | Larsson et al. | |
| 6,704,346 B1* | 3/2004 | Mansfield | 375/136 |
| 6,728,324 B1 | 4/2004 | Shan et al. | 375/346 |
| 6,760,309 B1 | 7/2004 | Gerten et al. | |
| 6,760,319 B1* | 7/2004 | Gerten et al. | 370/335 |
| 6,895,255 B1 | 5/2005 | Bridgelall | |
| 6,901,275 B1 | 5/2005 | Aoyagi | |
| 6,920,171 B2 | 7/2005 | Souissi et al. | |
| 6,925,105 B1* | 8/2005 | Partyka | 375/133 |
| 6,954,616 B2 | 10/2005 | Liang et al. | |
| 6,990,082 B1 | 1/2006 | Zehavi | |
| 7,016,395 B2* | 3/2006 | Watanabe et al. | 375/132 |
| 7,027,418 B2 | 4/2006 | Gan et al. | |
| 7,031,945 B1 | 4/2006 | Donner | |
| 7,046,649 B2 | 5/2006 | Awater et al. | |
| 7,073,080 B2 | 7/2006 | Lou | |
| 7,092,428 B2* | 8/2006 | Chen et al. | 375/132 |
| 7,099,671 B2 | 8/2006 | Liang | |
| 7,103,030 B2* | 9/2006 | Jones | 370/343 |
| 7,110,374 B2* | 9/2006 | Malhotra et al. | 370/329 |
| 7,127,210 B2 | 10/2006 | Aoyagi | |
| 7,149,474 B1 | 12/2006 | Mikhak | |
| 7,180,876 B1 | 2/2007 | Henry et al. | |
| 7,184,707 B2 | 2/2007 | Tada | |
| 7,193,989 B2 | 3/2007 | Melpignano | |
| 7,194,283 B2 | 3/2007 | Kardach et al. | |
| 7,236,511 B2* | 6/2007 | Batra et al. | 375/132 |
| 7,245,649 B2* | 7/2007 | Haartsen | 375/132 |
| 7,248,573 B2 | 7/2007 | Harrison et al. | |
| 7,280,580 B1* | 10/2007 | Haartsen | 375/138 |
| 7,292,617 B2* | 11/2007 | Beasley et al. | 375/132 |
| 2001/0022805 A1 | 9/2001 | Dabak et al. | 375/132 |
| 2002/0021746 A1* | 2/2002 | Schmidl et al. | 375/132 |
| 2002/0057726 A1* | 5/2002 | Williams et al. | 375/136 |
| 2002/0080855 A1* | 6/2002 | Watanabe et al. | 375/132 |
| 2002/0122462 A1* | 9/2002 | Batra et al. | 375/132 |
| 2002/0136268 A1 | 9/2002 | Gan et al. | 375/133 |
| 2002/0176385 A1* | 11/2002 | Huh et al. | 370/335 |
| 2002/0191677 A1* | 12/2002 | Chen et al. | 375/132 |
| 2002/0191678 A1* | 12/2002 | Batra et al. | 375/132 |
| 2003/0031231 A1* | 2/2003 | You et al. | 375/133 |
| 2003/0058829 A1* | 3/2003 | Batra | 370/345 |
| 2003/0081654 A1* | 5/2003 | Cooklev et al. | 375/132 |
| 2003/0086406 A1* | 5/2003 | Batra et al. | 370/345 |
| 2003/0091096 A1* | 5/2003 | Agrawal et al. | 375/132 |
| 2003/0147453 A1* | 8/2003 | Batra | 375/132 |
| 2003/0198200 A1* | 10/2003 | Diener et al. | 370/329 |
| 2003/0198280 A1* | 10/2003 | Wang et al. | 375/132 |
| 2004/0001530 A1* | 1/2004 | Lyle et al. | 375/132 |
| 2004/0008756 A1* | 1/2004 | Haartsen | 375/132 |
| 2004/0013168 A1* | 1/2004 | Haines et al. | 375/132 |
| 2004/0228388 A1* | 11/2004 | Salmenkaita | 375/132 |
| 2004/0258135 A1* | 12/2004 | Higgins, Jr. | 375/132 |
| 2005/0018751 A1* | 1/2005 | Roy et al. | 375/132 |
| 2005/0047481 A1* | 3/2005 | Lyle et al. | 375/132 |
| 2005/0069022 A1* | 3/2005 | Agrawal | 375/132 |
| 2005/0078737 A1* | 4/2005 | Craig et al. | 375/132 |
| 2005/0159106 A1* | 7/2005 | Palin et al. | 455/41.2 |
| 2005/0220135 A1* | 10/2005 | Honda et al. | 370/437 |
| 2005/0227626 A1* | 10/2005 | Stoddard et al. | 455/67.11 |
| 2006/0056492 A1* | 3/2006 | Honda | 375/132 |
| 2006/0133543 A1* | 6/2006 | Linsky et al. | 375/341 |
| 2006/0203707 A1* | 9/2006 | Lee et al. | 370/208 |
| 2007/0165754 A1* | 7/2007 | Kiukkonen et al. | 375/346 |

FOREIGN PATENT DOCUMENTS

| | | |
|---|---|---|
| KR | 20020067467 | 8/2002 |
| KR | 20020069498 | 9/2002 |
| KR | 20020087857 | 11/2002 |
| RU | 2000109972 | 6/2002 |
| WO | 03071706 | 6/2006 |

OTHER PUBLICATIONS

Jaap C. Haartsen, "Method for FH Sequence Adaptation," Ericsson, Mar. 16, 2000, 5 pages.

Intersil Data Sheet, "Wireless LAN Integrated Medium Access Controller with Baseband Processor," Nov. 2001, 46 pages.

International Search Report, PCT/US2005/044794 - International Search Authority - US, Mar. 6, 2007.

International Preliminary Report on Patentability, PCT/US2005/044794 - International Search Authority - The International Bureau of WIPO - Geneva, Switzerland, Jun. 26, 2007.

Written Opinion, PCT/US2005/044794 - International Search Authority - US, Mar. 6, 2007.

ANSI/IEEE Std 802.11, 1999 Edition, IEEE Standard for Information technology.- Part 11: Wireless LAN Medium Access Control (MAC) and Physical Layer (PHY) Specifications.

ANSI/IEEE Std 802.11b, 1999 Edition, Supplement to IEEE Standard for Information technology - Part 11: Wireless Lan Medium Access Control (MAC) and Physical Layer (PHY) Specifications: Higher-Speed Physical Layer Extension in the 2.4 GHz Band.

ANSI/IEEE Std 802.11g, 2003 Edition, IEEE Standard for Information technology - Part 11: Wireless LAN Medium Access Control (MAC) and Physical Layer (PHY) Specifications: Amendment 4: Further Higher Data Rate Extension in the 2.4 GHz Band.

* cited by examiner

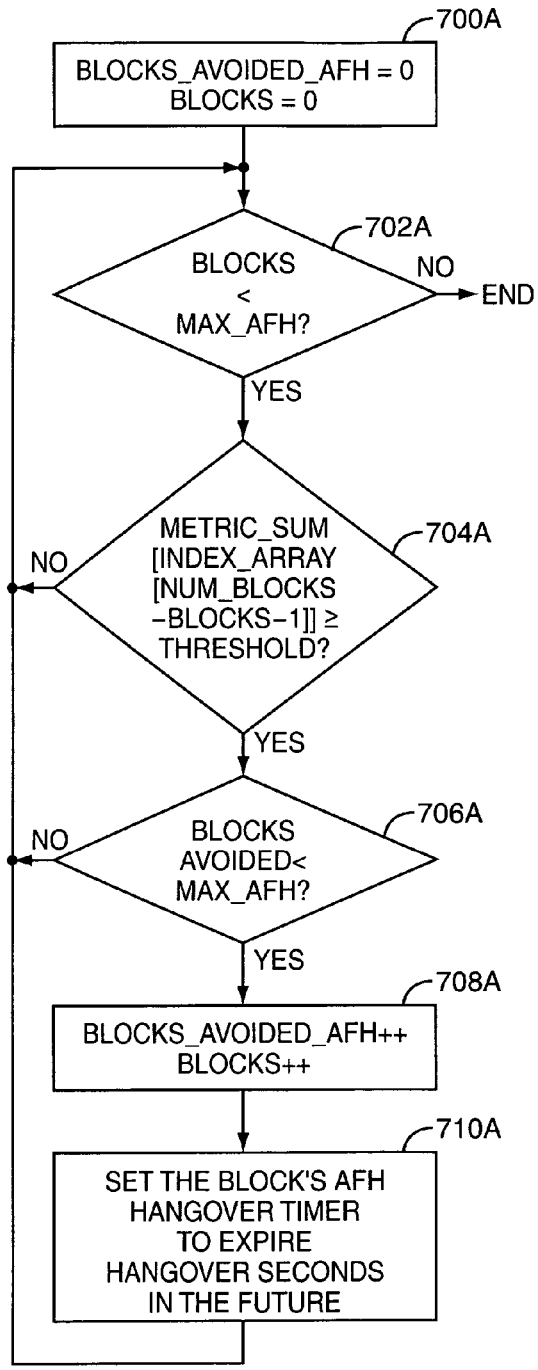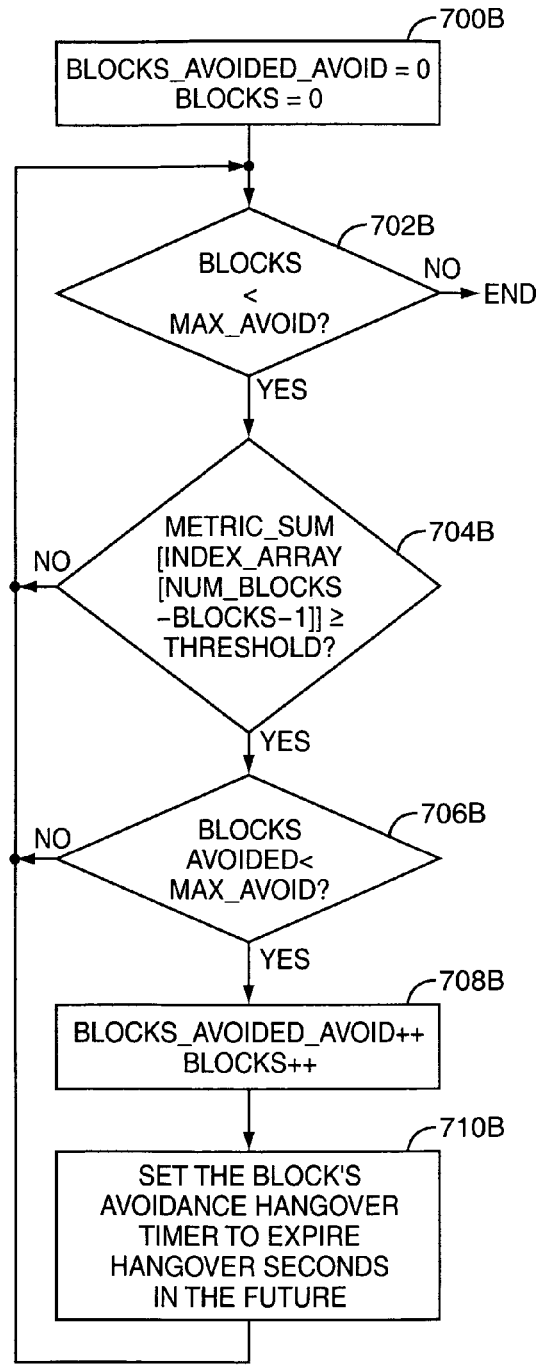
*FIG. 7A*  *FIG. 7B*

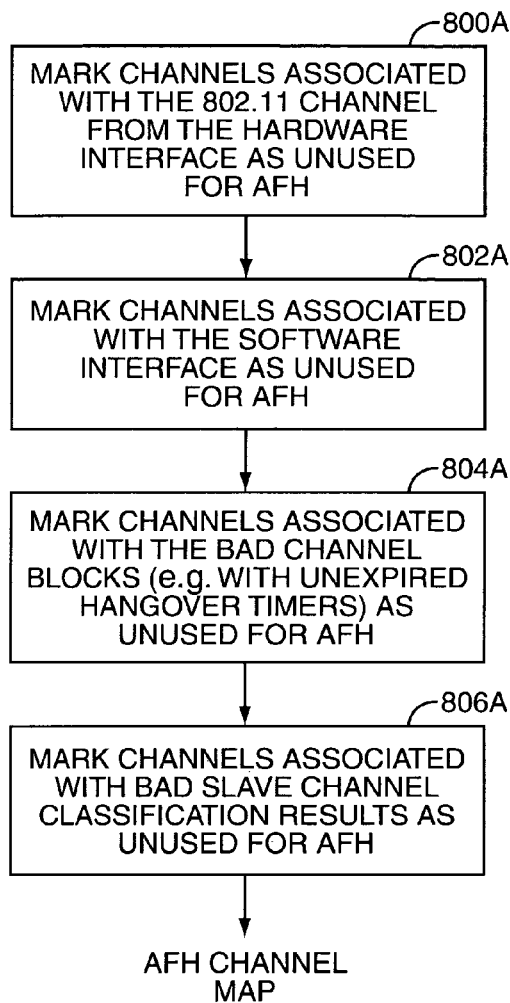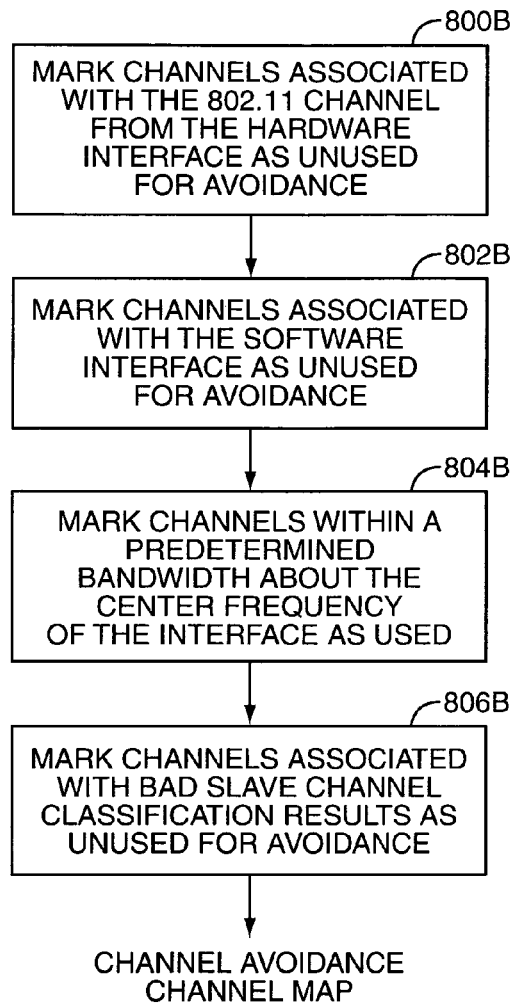
FIG. 8A
FIG. 8B

METHOD AND APPARATUS FOR PERFORMING CHANNEL ASSESSMENT IN A WIRELESS COMMUNICATION SYSTEM

CROSS-REFERENCE TO RELATED APPLICATIONS

This invention is related to commonly-assigned application Ser. No. 10/216,082, filed Aug. 8, 2002, entitled "Method and Apparatus for a Dual-Mode Radio in a Wireless Communication System"; commonly-assigned application Ser. No. 10/235,090, filed Sep. 3, 2002, entitled "Method and Apparatus Implementing an Overlay Adaptive Frequency Hopping Kernel in a Wireless Communication System"; and commonly-assigned provisional application Ser. No. 60/538,138, filed Jan. 20, 2004, entitled "Method and Apparatus for Performing 802.11—Assisted Channel Assessment in an 802.11/Bluetooth™ Collocated Device", all of which are hereby incorporated herein by reference in their entireties and are referred to hereafter as "the related applications."

FIELD OF THE INVENTION

This invention relates to the field of wireless communication systems, and more particularly to the field of performing channel assessment (CA) in a wireless communication system.

BACKGROUND OF THE INVENTION

As is well known in the wireless data communications arts, a common trade-off in the design of communication systems is performance versus bandwidth. That is, various aspects of communication performance can be improved at the expense of increased radio frequency (RF) bandwidth. One very important factor contributing to the performance of a communication system is the "quality" of the data channels used in the system. As is well known, data reception errors can be caused by the introduction of noise and interference during data transmissions across a channel. Signal interference distorts signals and their associated data during transmissions over the channel. A source of such noise and interference is radio-frequency interference (RFI) such as multi-path fading, multiple-access interference, and hostile jamming. Channel quality depends largely on the amount of noise and interference that exists on a channel relative to the strength of the signal levels of the channel. A channel that has a small amount of noise relative to the strength of the signals has high channel quality. Conversely, a channel that has a large amount of noise relative to the signal levels has low channel quality. Channel quality is typically measured in terms of the signal-to-noise (SNR) or Es/No (i.e., ratio of signal energy to noise energy) of a channel.

A wireless communication system can be properly designed to operate reliably in the presence of various types of noise and radio-frequency interference. For example, signals with very large RF bandwidths can be generated using a method known as adaptive frequency hopping (AFH) in which the carrier frequency of a digital communication signal is adaptively changed, or "hopped," over a wide range of frequencies. One such AFH digital communication system is the Bluetooth™ protocol system that facilitates the transport of data between Bluetooth devices. Bluetooth technology is described in more detail in a specification published by the Bluetooth Special Interest Group (SIG), entitled "Specification of the Bluetooth System, version 1.2", electronically available to the public via the well-known Internet at <http://www.Bluetooth.com>, published on Nov. 5, 2003, referred to herein as the "Bluetooth Specification" and is incorporated herein by reference in its entirety for its teachings on Bluetooth flow control, signals, devices and communication protocols and schemes. As used herein, "Bluetooth device," "Bluetooth communication system" or any variation thereof refer to a device or system operating according to the Bluetooth™ protocol.

As described in more detail in the above-incorporated related applications, and in the incorporated Bluetooth Specification, Bluetooth communication systems use a frequency-hopping spread spectrum (FHSS) scheme when communicating between master and slave devices. In accordance with this frequency hopping spread spectrum scheme, frequencies are switched during data transmissions. Frequency hopping is performed in accordance with specified frequency-hopping algorithms so that devices can independently determine the correct frequency-hopping sequences (i.e., ordered lists of frequencies, sometimes referred to as "hop-sets"). In one example, pseudo-random FH sequences are independently determined by slave devices using their associated master device address and clock information.

Although the FH sequence associated with each Bluetooth master device is unique, piconets operating within close proximity can interfere with one another due to the relatively small number of independent channels used by the Bluetooth devices. In addition, channel noise and interference can be caused by a number of non-Bluetooth devices operating within close proximity to the Bluetooth devices. For example, as described in the above-incorporated related applications, an 802.11 protocol device operating within close proximity to a Bluetooth device can cause undesirable RF interference rendering one or more of the channels in the Bluetooth device's hop-set unusable. As is well known, the various IEEE 802.11 communication protocols (referred to hereinafter as "802.11") are global standards for radio communications operating at 2.4 GHz radio frequencies. One exemplary well-known 802.11 communications protocol is the IEEE 802.11b protocol (referred to hereinafter as "802.11b"). The 802.11b protocol allows 802.11b devices (i.e., those that comply with the 802.11b standard) to operate at high data transmission rates (e.g., 11 Mbps). The 802.11b protocol is particularly useful in implementing Wireless Local Area Networks (WLANs). Devices complying with the 802.11b standard are described in more detail in a standard produced by the IEEE 802 Working Group, entitled "IEEE Std 802.11b-1999", electronically available to the public via the well-known Internet at <http://standards.ieee.org>, referred to herein as the "802.11b Specification," and is hereby incorporated herein by reference in its entirety for its teachings on 802.11b flow control, signals, devices and communication protocols and schemes. Another exemplary IEEE 802.11 communications protocol is the newly emerging IEEE 802.11g.

As noted above, one technique that may be used in solving interference problems is AFH. The purpose of AFH is to allow Bluetooth devices to improve their immunity to interference while allowing them to avoid causing interference to other devices in the Industrial, Scientific, and Medical (ISM) 2.4 GHz band. The basic principle is that Bluetooth channels are classified into two categories, used and unused, where used channels are part of the hopping sequence and unused channels are replaced by used channels in a pseudo-random manner in the hopping sequence. This classification mechanism allows for the Bluetooth devices to use 79 or fewer channels required in the incorporated Bluetooth Specification. Note that, in the United States, at least 75 channels (MHz) were required until 2002 when the FCC changed its regulations.

The current minimum number of channels in the United States is 15, although there are other places (such as Europe) that require at least 20 channels. Hence, the minimum number of channels allowed by the incorporated Bluetooth Specification, $N_{MIN}$, is 20.

An exemplary AFH Hopping Sequence follows. As an example, imagine that Bluetooth uses 10 channels (0 through 9). If all channels were "good," a hopping pattern might be as follows:

4 6 1 7 5 3 9 3 4 1 2 1 6 5 3 8 6 1 0 3 8 4 0 2

Now, if channels 6 and 7 were determined to be "bad," the hopping pattern would appear as follows:

4 x 1 x 5 3 9 3 4 1 2 1 x 5 3 8 x 1 0 3 8 4 0 2

In each case the value of "x" would be pseudo-randomly selected from the other 8 valid channels (0-5 and 8-9). Then, the new hopping sequence, after substitution, would appear as follows:

4 5 1 9 5 3 9 3 4 1 2 1 1 5 3 8 0 1 0 3 8 4 0 2

The incorporated Bluetooth Specification defines the aspects of AFH that are necessary to ensure interoperability. This includes the hopping kernel, baseband behavior, Link Manager Protocol (LMP) commands, and Host Controller Interface (HCI) commands and events required to change and configure the hopping sequences. The Bluetooth Specification also defines a mechanism that allows a slave to report channel classification information to a master. However, the Bluetooth Specification does not define or describe any specific requirements of the channel assessment mechanism. Channel assessment is left to the innovation of the various chipset and end product manufacturers.

As described above, "channel assessment" can be implemented as an algorithm that is used by a Bluetooth device to determine a channel map of which channels are good and which are bad within the 2.4 GHz ISM band. This channel map can then be used for Adaptive Frequency Hopping (AFH) or proprietary coexistence techniques such as channel avoidance. For example, the channel map can be used to determine which channels are "used" (i.e., the "good" channels from the channel map), and which are "unused" (i.e., the "bad" channels from the channel map).

At present, channel assessment algorithms have used either active measurements (e.g., bit error rate, or packet error rate) or passive measurements (e.g., Received Signal Strength Indication (RSSI) measurement scan of the ISM band) in generating the channel maps. Disadvantageously, when using either passive or active measurements, the accuracy of the measurements depends on a number of factors including: the duty cycle of the interferer, the number of interferers, the number of samples used, etc. In general, these techniques are designed to provide an accurate estimate of the interference. However, in the end, the result is only a guess of what the interference profile truly looks like. Therefore, using these techniques, the interference profile will never be 100% accurate.

Therefore, a need exists for a method and apparatus that estimates and detects the presence of RF interference in a data channel. The data channel may have been previously determined by an AFH scheme to be "disallowed" (i.e., exhibited bad channel conditions), or it may be a channel within a frequency hop-set. The interference detection apparatus and method should be amenable for use in any communication system where the presence of intermittent interference needs to be detected.

SUMMARY OF THE INVENTION

The present invention provides a system and method for classifying channels in a frequency hopping wireless communication system. In general, the system includes a data collection engine and a data analysis engine. The data collection engine operates to obtain channel metrics indicating the level of interference for each channel used by the wireless communication system. The data analysis engine operates to provide a channel map for adaptive frequency hopping (AFH) and/or a channel map for channel avoidance. More specifically, the data analysis engine first operates to filter the channel metrics to remove channel metrics indicative of frequency hopping interference such that only channel metrics indicative of frequency static interference remain. Next, the channels are divided into a number of channel blocks, each including at least two adjacent channels. For each channel block, the channel metrics of the channels within the channel block are combined to provide a metric sum. The data analysis engine then operates to classify each channel as usable or unusable based on the metric sums for each of the channel blocks.

To provide the channel map for AFH, the data analysis engine first finds the channel blocks having the worst interference based on the metric sums for the channel blocks. In one embodiment, the data analysis engine finds the worst MAX_AFH channel blocks, where MAX_AFH is a number of blocks corresponding to a maximum number of channels that may be classified as unusable for AFH. Once the channel blocks having the worst interference are found, the data analysis engine compares the metric sum for each of these channel blocks to a threshold value. If the metric sum exceeds the threshold value, a hangover timer for the channel block is set to a predetermined maximum value, and the channels within the channel block are classified as unusable. Once the hangover timer is set, the corresponding channels cannot be classified as usable until the hangover timer has expired. In addition, remote metrics from devices such as an associated wireless device or a slave device may be used to further classify the channels.

To provide the channel map for channel avoidance, the data analysis engine first finds the channel block having the worst interference based on the metric sums for the channel blocks and, optionally, recent peak values of the metric sums for the channel blocks. Once the channel block having the worst interference is found, the metric sums or, optionally, the metric sum peak values are filtered to find the channel corresponding to a center frequency of the frequency static interference. Thereafter, the channel corresponding to the center frequency and channels within a predetermined bandwidth about the center frequency are classified as unusable. In addition, remote metrics from devices such as an associated wireless device or a slave device may be used to further classify the channels.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 7A and 7B are flow charts illustrating the operation of the interference versus time block of the data analysis engine of FIG. 4 according to one embodiment of the present invention; and FIGS. 8A and 8B are flow charts illustrating the operation of the metric combiner of the data analysis engine of FIG. 4 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
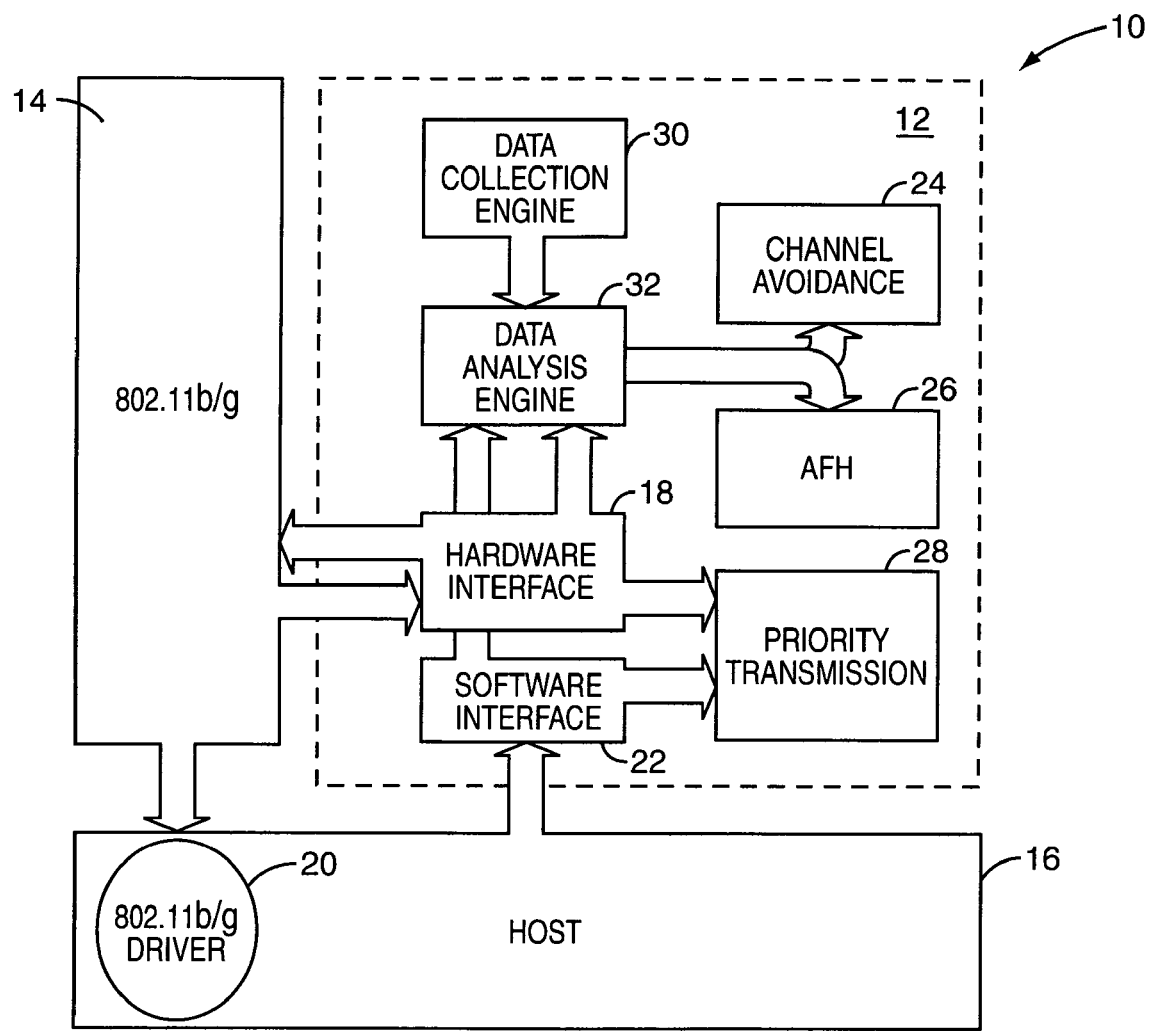
FIG. 1 is a block diagram of a system including the channel assessment system of the present invention.

FIG. 1 illustrates an exemplary system 10 including a Bluetooth device 12, a wireless device 14 operating according to either the 802.11b or 802.11g standard, and a host 16. In general, the Bluetooth device 12 and the wireless device 14 communicate via a hardware interface 18 to exchange information such as priority information and channel information. The host 16 may be a personal computer, a mobile telephone, a personal digital assistant (PDA), or the like and includes a driver 20 that enables communication with the wireless device 14. The host 16 may also communicate with the Bluetooth device 12 via a software interface 22 to provide information such as channel information. It should be noted that the system 10 is merely exemplary. The Bluetooth device 12 may operate in combination with only one of the wireless device 14 and the host 16, or the Bluetooth device 12 may operate independently without the wireless device 14 and the host 16.

In this embodiment, the Bluetooth device 12 may perform three types of coexistence: channel avoidance, adaptive frequency hopping (AFH), and priority transmission. Accordingly, the Bluetooth device 12 includes a channel avoidance system 24, an AFH system 26, and a priority transmission system 28. The Bluetooth device 12 may be configured to use either channel avoidance or AFH depending on whether it is communicating with a Bluetooth 1.1 device or a Bluetooth 1.2 device.

The present invention provides a system and method for providing a channel map to one or both of the channel avoidance system 24 and the AFH system 26. More specifically, channel assessment (or channel "classification") is performed in two logical steps, data collection, and data analysis. As illustrated in FIG. 1, these steps are performed by a data collection engine 30 and data analysis engine 32. In one embodiment, the Bluetooth device 12 is a Bluetooth master device, and the output of the data analysis engine 32 is a set of used and unused channels, or a channel map, used by the channel avoidance system 24 or the AFH system 26. The output of the data analysis engine 32 may alternatively be a first channel map for the channel avoidance system 24 and a second channel map for the AFH system 26. In another embodiment, the Bluetooth device 12 is a Bluetooth slave device, and the output of the data analysis engine 32 is the same set of used and unused channels used by the channel avoidance system 24. In addition, when enabled as a slave device, the channel map may be reported to a master Bluetooth device.

Data Collection

In exemplary embodiment, the data collection engine 30 periodically gathers metrics on every channel in the wireless communication system. The number of metrics collected on each channel may be configurable. In addition, other parameters may be configurable, including threshold levels and a metrics gathering period. In one exemplary embodiment of the present invention, the data collection engine 30 collects two types of information or metrics: received signal strength information (RSSI) and packet error rate information (PER).

The data collection engine 30 operates in one of two modes of operation: Personal Computer (PC) mode and cell phone mode. The two different modes of operation have different power consumption requirements. The cell phone mode of operation may also be used in other similar power consuming platforms, such as, Personal Digital Assistants (PDAs), and other devices having limited battery capacities and similar power consumption characteristics.

In the PC mode of operation, the data collection engine 30 periodically performs channel assessment by gathering interference information and determining a channel metric for each channel using either a passive channel assessment scheme or an active channel assessment scheme. More specifically, interference information is gathered and the channel metrics are determined during an active connection, and during a defined collection period (referred to herein as the "Channel Classification Interval"). In one exemplary embodiment, the collection period is an interval, in seconds, between instances when the interference information is gathered and the channel metrics are determined. In one embodiment, the default value of collection period is 2 seconds. During an idle mode, the interference information is gathered and the channel metrics are determined during a separately defined idle mode collection period (referred to herein as the "Idle Mode Channel Classification Interval"). In one exemplary embodiment, the idle mode collection period is an interval, in seconds, between instances when the interference information is gathered and the channel metrics are determined during idle mode. In one embodiment, the default value of the idle mode collection period is 60 seconds. The two collection periods may be different from one another and may vary to accommodate speed and power consumption requirements of a particular application.

In the cell phone mode of operation, channel assessment is only performed when there is noticeable degradation on an audio link. This is done to minimize the current consumption associated with channel assessment functions. In one exemplary embodiment, a packet error rate (PER) is determined for each received packet. When the PER exceeds a predetermined threshold, channel assessment is performed. More specifically, interference information is gathered and channel metrics are determined only when the PER has exceeded the predetermined threshold. Thus, in the cell phone mode, channel assessment is only performed when necessary rather than periodically, thereby decreasing power consumption. It should be noted that once channel assessment is triggered for the cell phone mode, channel assessment proceeds just as for the PC mode of operation, the only difference being that channel assessment is performed periodically when in the PC mode but is only performed when necessary when in the cell phone mode.

The channel assessment mechanism used in both the PC mode and the cell phone mode of operation is described in more detail below. Many techniques can be used to detect interference. One such technique described in this application uses a passive scheme using RSSI metrics. This technique is very sensitive and detects very low level interferers (well below the level that would cause interference to a Bluetooth receiver). For applications that are very sensitive to power consumption and only need to protect Bluetooth performance (i.e., do not need to be a "good neighbor"), passive measurements are used only as required. In these cases, packet error rate (PER) or packet loss rate (PLR) can be used to determine "bad" channels. The details of the metric gathering process are shown in the following sections.

Passive Channel Assessment

Passive channel assessment is typically a lower priority task than many other events in a Bluetooth system. However, there should ideally be a minimum amount of time guaranteed for channel assessment to ensure that AFH works well. When the amount of time allocated for channel assessment is less than the required amount, channel assessment will be slow or unable to avoid interference. In the PC mode of operation, the collection period (Channel Classification Interval) defines the time between passive channel assessments of every channel during a connection, and the idle mode collection period (Idle Mode Classification Interval) defines the time between passive channel assessments of every channel during idle mode. In the cell phone mode of operation, passive channel assessment is triggered only when the packet error rate, detected during active channel assessment, of received packets exceeds a defined threshold.

Whenever passive channel assessment is performed, regardless of the mode of operation, in order to have an acceptable estimate of a channel (i.e., in order to ensure that high quality statistics for the channel will be obtained), a minimum number of samples (referred to herein as "Required Samples") should be obtained for each channel. In one embodiment, the default value for the number of required samples per channel per period ("Required Samples") is 20. In one exemplary embodiment, this means that the total number of samples will equal or exceed a product of the required samples per channel per period and the total number of Bluetooth channels (Required Samples×79), where 79 is the total number of Bluetooth channels. Thus, for example, if the number of required samples for each channel per period is 10, then the total number of samples that will be obtained is 790. A design tradeoff exists between the air time used for channel assessment and the speed, quality and accuracy of channel classification.

Figure 2:
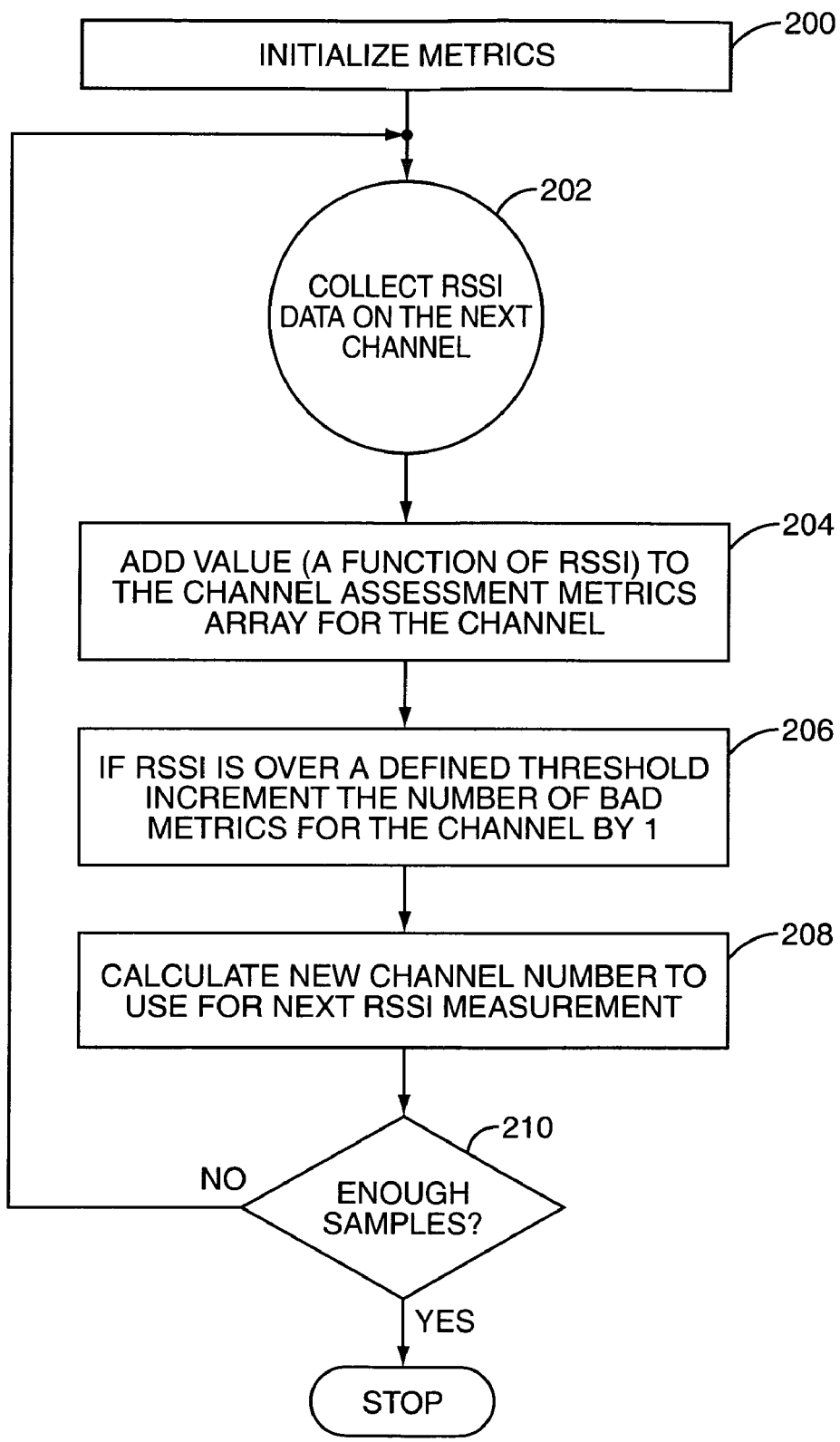
FIG. 2 is a flow chart illustrating the operation of the data collection engine of the channel assessment system according to one embodiment of the present invention.

FIG. 2 is a flow chart illustrating exemplary operation of the data collection engine 30 when performing passive channel assessment. Passive channel assessment begins by initializing a channel metric for each channel to some default value such as zero (step 200). Next, interference information is collected for a first channel (step 202). In this embodiment, the interference information is RSSI. Next, the RSSI for the first channel is compared to a series of threshold values, and a value corresponding to a largest one of the series of thresholds exceeded is added to the channel metric for the first channel in a channel assessment metrics array (step 204). It is important to note that by comparing the RSSI to a series of threshold values, the value added to the channel metric is a function of the RSSI. Then, if the RSSI is over a predefined threshold, a stored value for corresponding to a number of bad metrics for the channel is incremented by one (step 206). The channel number for the next measurement of RSSI is calculated (step 208). If the channel assessment is occurring during an active connection, the next channel number may be the next channel in the hopping sequence. If the channel assessment is occurring during an idle time, the next channel may be the next channel in a predetermined hopping sequence or simply the next channel (current channel+1). Next, a decision is made as to whether a sufficient number of samples have been obtained (step 210). As discussed above, it is desirable to obtain more than one sample for each channel. Thus, if there are 79 channels and 10 samples are desired for each channel, steps 202-208 are iteratively performed 790 times. Once the desired number of samples is obtained, the process ends.

In one exemplary embodiment, a deterministic hopping sequence is required for measuring RSSI so that each channel is sampled the same number of times. In one embodiment, the hopping sequence is designed to have a variable skip rate. Each time the RSSI is obtained, it is compared against the series of threshold values. For example, the series of thresholds may be every 3 dB over −75 dBm. When the sampled RSSI value exceeds a minimum threshold value, some type of interference exists on the channel, and an error is recorded. The magnitude of the error is based on which element of the threshold array is being compared to the RSSI value. The inventor has found that using a simple Boolean approach with regard to the RSSI threshold value (i.e., determining whether the RSSI value is either above or below a threshold) yields inferior results. Instead, as noted above, the present inventive method and apparatus uses a weighted value analysis to determine the magnitude value added to the channel metric for each channel as a function of the RSSI. This significantly aids in determining the center of the interference. It also aids in identifying which channels are particularly troublesome and should be blocked out. If for example, only 20 channels can be blocked out, but 40 channels are detected as being "bad," it is important to identify the particularly troublesome channels (i.e., those exhibiting the worst interference characteristics).

Figure 3:
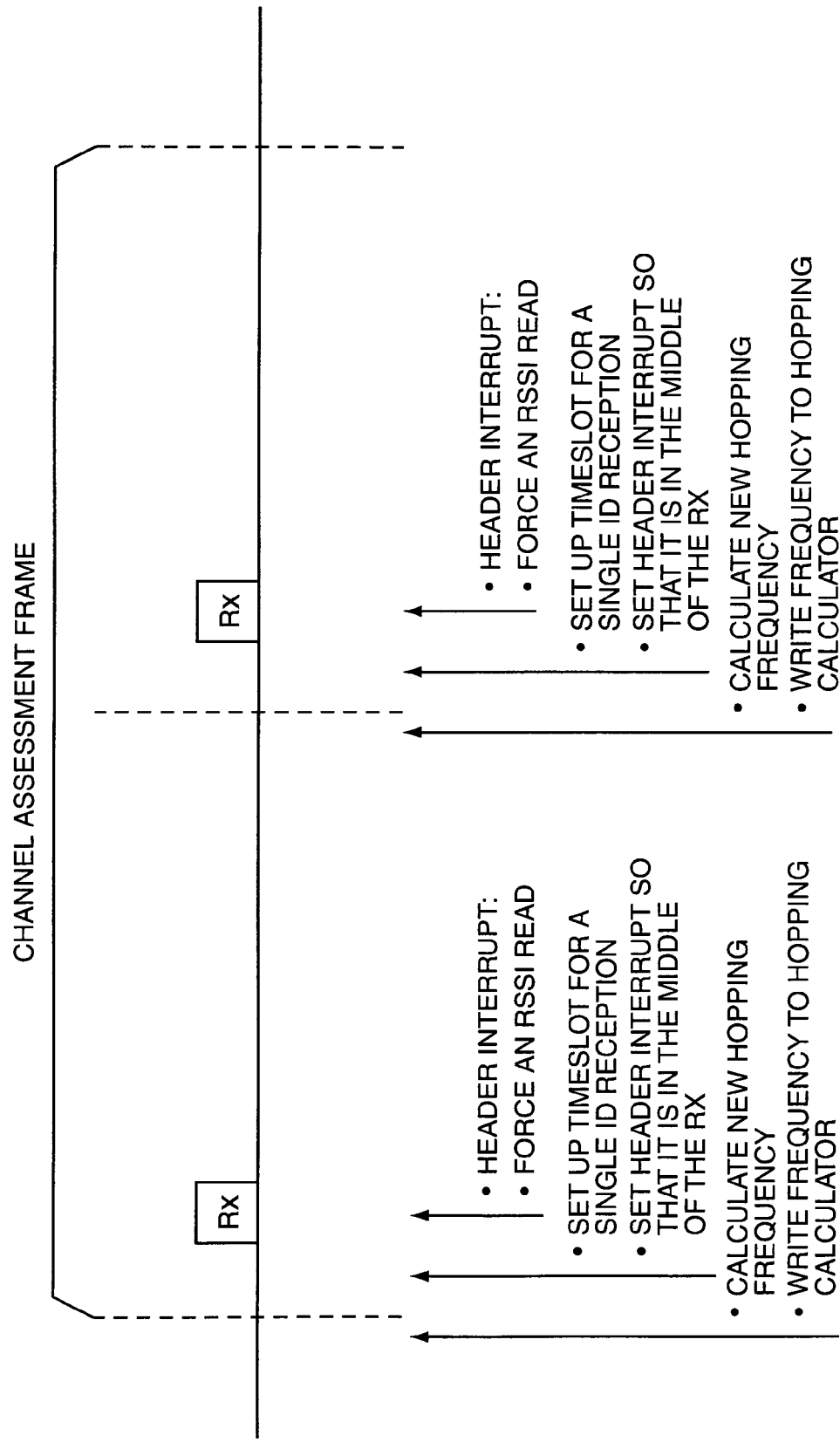
FIG. 3 illustrates an exemplary channel assessment frame used in practice with the present invention.

Channel assessment can be performed at the master device using channel assessment frames. As illustrated in FIG. 3, in one embodiment, a channel assessment frame comprises two back-to-back timeslots used to determine the presence or absence of a signal. These frames should be scheduled similarly to the scheduling of other frames in the system using a priority scheme.

In one embodiment, timing of these measurements could be similar to timing that is used for receiving multiple ID packets within a single Bluetooth timeslot (625 microseconds in duration). As is shown in the FIG. 3, both timeslots in the channel assessment frame are set up identically. Initially, a frequency is calculated and written to a synthesizer. Hardware is then configured to receive for the duration necessary to measure the RSSI. A second frequency is calculated and written to the synthesizer, and a second reception is performed in the second half-slot (i.e., the last 312.5 microseconds of the 625 microsecond timeslot).

Whenever possible, the Bluetooth device 12 performs passive channel assessment events during unused timeslots. In many cases, this will not result in reduced throughput, especially in the case of synchronous connections. However, it may be the case that an application attempting to use full throughput may suffer reduced throughput due to channel assessment. In most cases, however, the effect will be small, spread out over the collection period for the channel assessment, and will not noticeably reduce throughput.

In some embodiments, when the Bluetooth device 12 is a master device, channel assessment frames (two timeslots) can be scheduled similarly to other Bluetooth events. A slave device, however, may only use frames where it is not addressed by the master device. Channel assessment, for the slave, does not reduce the amount of time a slave is available to the master. In some embodiments, it is possible to schedule absences (for example, using the "Absence Mask" feature) specifically for the purposes of scheduling metric gathering periods.

Active Channel Assessment

In some embodiments, active channel assessment is performed on all received packets. Packet error rate (PER) statistics (i.e., percentage of Cyclic Redundancy Code (CRC) failures) and packet loss rate (PLR) statistics (i.e., percentage of packets lost due to a missed access code or packet header error) are collected on packets on a per channel basis. The PER/PLR statistics are evaluated periodically. The interval between each evaluation of the PER/PLR statistics is defined herein as a PER Interval. In one embodiment, the PER interval default value is 10 seconds. In accordance with this embodiment, the access code, packet header and CRC are evaluated after every packet reception. The total number of events and the number of missed access codes, bad packet headers and bad CRCs are stored.

Because active channel assessment techniques use normal packet transmissions, there is no added power consumption unless the PER/PLR exceeds a defined threshold. As discussed above with respect to the cell phone mode of operation, when the PER/PLR exceeds the defined threshold, the passive channel assessment described above is triggered. The additional power consumption is therefore based on the average number of passive channel assessments per unit time. In most cases, the additional power consumption will be nearly zero.

Data Analysis and Channel Classification

In either the PC or cell phone mode of operation, after passive channel assessment is performed, the channel metric for each channel is provided to the data analysis engine 32 (FIG. 1). The data analysis engine 32 operates to determine which channels are good and which channels are bad based on the channel metrics, thereby creating one or more channel maps to be used for AFH and/or channel avoidance. According to the present invention, the channel metrics are analyzed using a multi-stage process. The inventive multi-stage data analysis and channel classification process 400 is performed by the data analysis engine 32 and is illustrated in the simplified block diagram of FIG. 4.

Figure 4:
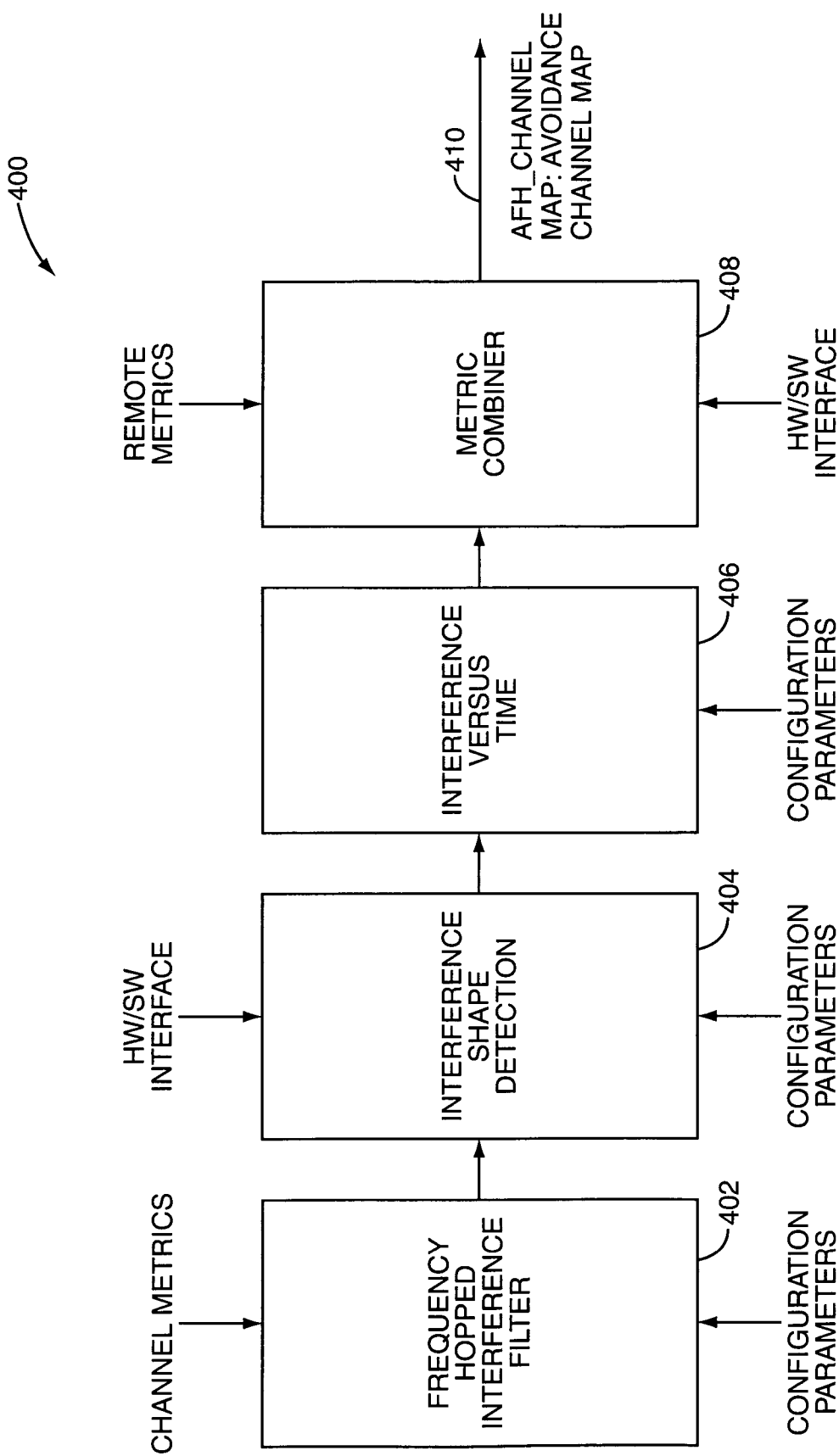
FIG. 4 is a more detailed block diagram of the data analysis engine of the channel assessment system of the present invention.

As illustrated in FIG. 4, the inventive multi-stage data analysis and channel classification process 400 performed by the data analysis engine 32 of the present invention includes a frequency hopped interference filtering stage 402, an interference shape detection stage 404, an interference versus time stage 406, and a metric combiner stage 408. In one exemplary embodiment, after the channel metrics are processed by the data analysis engine 32, they are reset. Although the channel metrics used by the data analysis and channel classification process 400 are obtained from the local data collection engine 30 (FIG. 1) as described above, a Bluetooth 1.2 device (i.e., a device conforming to the above-incorporated Bluetooth Specification) may also use metrics obtained from other sources. For example, a Bluetooth 1.2 device may take into account remote metrics obtained from the host device 16 (FIG. 1) via the software interface 22, from the wireless device 14 via the hardware interface 18, or from slaves if they are Bluetooth 1.2 devices and are enabled to report channel classification information. These remote metrics, together with configuration parameters, may be processed by the present inventive data analysis and channel classification process 400. As shown in FIG. 1, the process 400 produces an AFH Channel Map which is used as an input to the AFH system 26. The process 400 may also produce an avoidance channel map which can be used as input to the channel avoidance system 24. As noted above, the process 400 may provide the AFH channel map and the avoidance channel map. Alternatively, the process 400 may provide only the AFH channel map or only the avoidance channel map.

In one exemplary embodiment, when local channel assessment mechanisms are enabled, the data analysis proceeds according to the processing blocks shown in FIG. 4. That is, the local channel metrics are first processed by the frequency hopped interference filtering stage 402, then processing continues with the interference shape detection stage 404, the interference versus time stage 406, and the metric combiner stage 408. However, local channel assessment may be disabled, in which case the analysis skips the first three processing blocks shown in FIG. 4 (i.e., blocks 402, 404, and 406 are skipped), and processing is performed only by the Metric Combiner stage 408. In one embodiment of the present inventive method and apparatus, local channel assessment can be enabled or disabled using a predefined command that is communicated to the Bluetooth device 12. Once all of the local metrics are made available to the data analysis and channel classification process 400, the multi-stage process is used to improve the reliability and quality of interference detection. Each processing stage is now described in more detail.

Stage 1: Frequency Hopped Interferer Filter

At the first stage of processing, frequency hopped interference such as but not limited to interference caused by nearby Bluetooth devices is filtered out by the frequency hopped interference filtering stage 402. The frequency hopped interference is filtered in order to reveal frequency static interference from sources such as 802.11, cordless phones, some types of microwave ovens and similar devices. One goal of the inventive method and apparatus is to detect and identify static (i.e., "non-frequency hopped") interferers. Therefore, it is important to first filter out frequency hopped interferers before additional data analysis is performed.

In operation, once the channel metrics are obtained by the data collection engine 30 (FIG. 1) using the passive channel assessment described above, a first pass is made over the channel metrics to determine whether each channel has been interfered with more than a certain percentage of the time. Because frequency hopped interference occurs approximately once every N frequency hops, where N is the number of channels used in the frequency hopping sequence, two devices using 79 channels will interfere with each other approximately once every 79 packets if both piconets are fully active and using single slot packets. This interference grows as the number of piconets in the area grows. Therefore, if there are M piconets, the probability of error is $\geq M/N$. By selecting a minimum RSSI percent threshold that is above an expected number of nearby piconets, it is possible to filter out the interference produced by nearby piconets. For example, if the number of expected nearby piconets is 5, then the minimum RSSI percent threshold used to configure the frequency hopped interference filtering stage 402 would be set to 5/79 or 6.3%. The minimum RSSI percent threshold may be input to the frequency hopped interference filtering stage 402 as a configuration parameter or hard-coded into the software.

Figure 5:
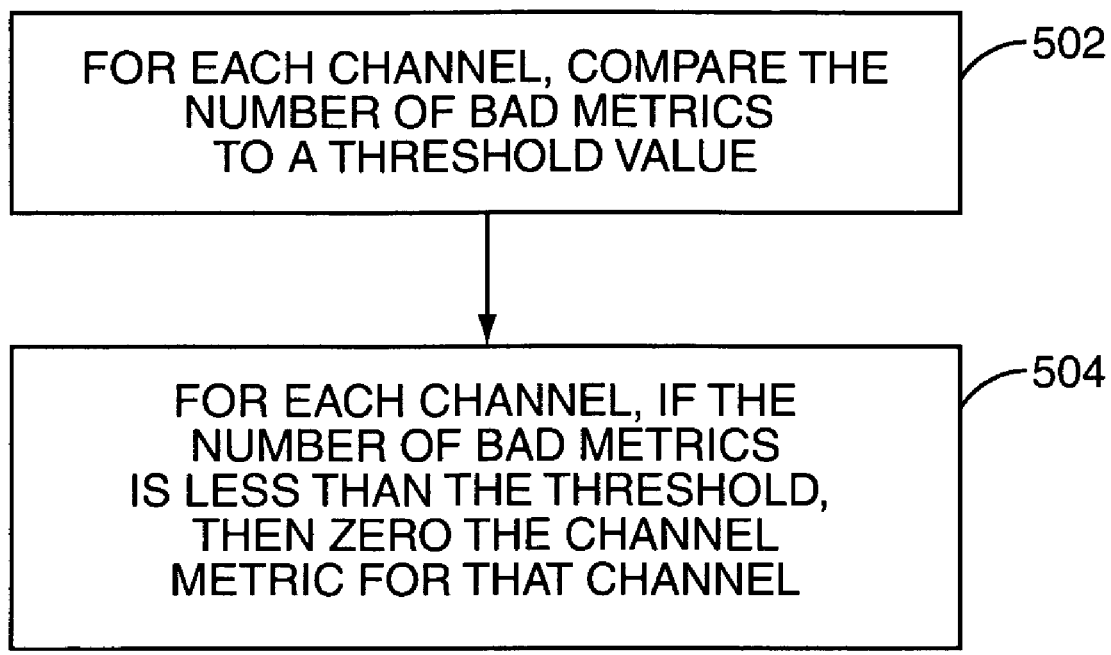
FIG. 5 is a flow chart illustrating the operation of the frequency hopped interference filter of the data analysis engine of FIG. 4 according to one embodiment of the present invention.

FIG. 5 is a flow chart illustrating one embodiment of the frequency hopped interference filtering stage 402. Before discussing FIG. 5, it may be beneficial to recall that the passive channel assessment provides two values for each channel: a channel metric and a value corresponding to the number of bad metrics. The channel metric is a sum of the values determined as a function of the measured RSSI for each sample for the channel. The number of bad metrics is the total number of RSSI measurements for the channel that exceeds a predetermined threshold.

As illustrated in FIG. 5, the frequency hopped interference filtering stage 402 first compares the number of bad metrics for each channel to a threshold value (step 502). If the desired RSSI percent threshold is 5/79 or 6.3%, then the threshold value is 5. For each channel, if the number of bad metrics is less than the threshold, which for example may be 5, then the channel metric for that channel is set to zero or some other arbitrary number (step 504). Thus, channel metrics corresponding to frequency-hopping interferers (non-static interferers) are removed and only channel metrics corresponding to static interferers remain.

Stage 2: Interference Shape Detection

Figure 6:
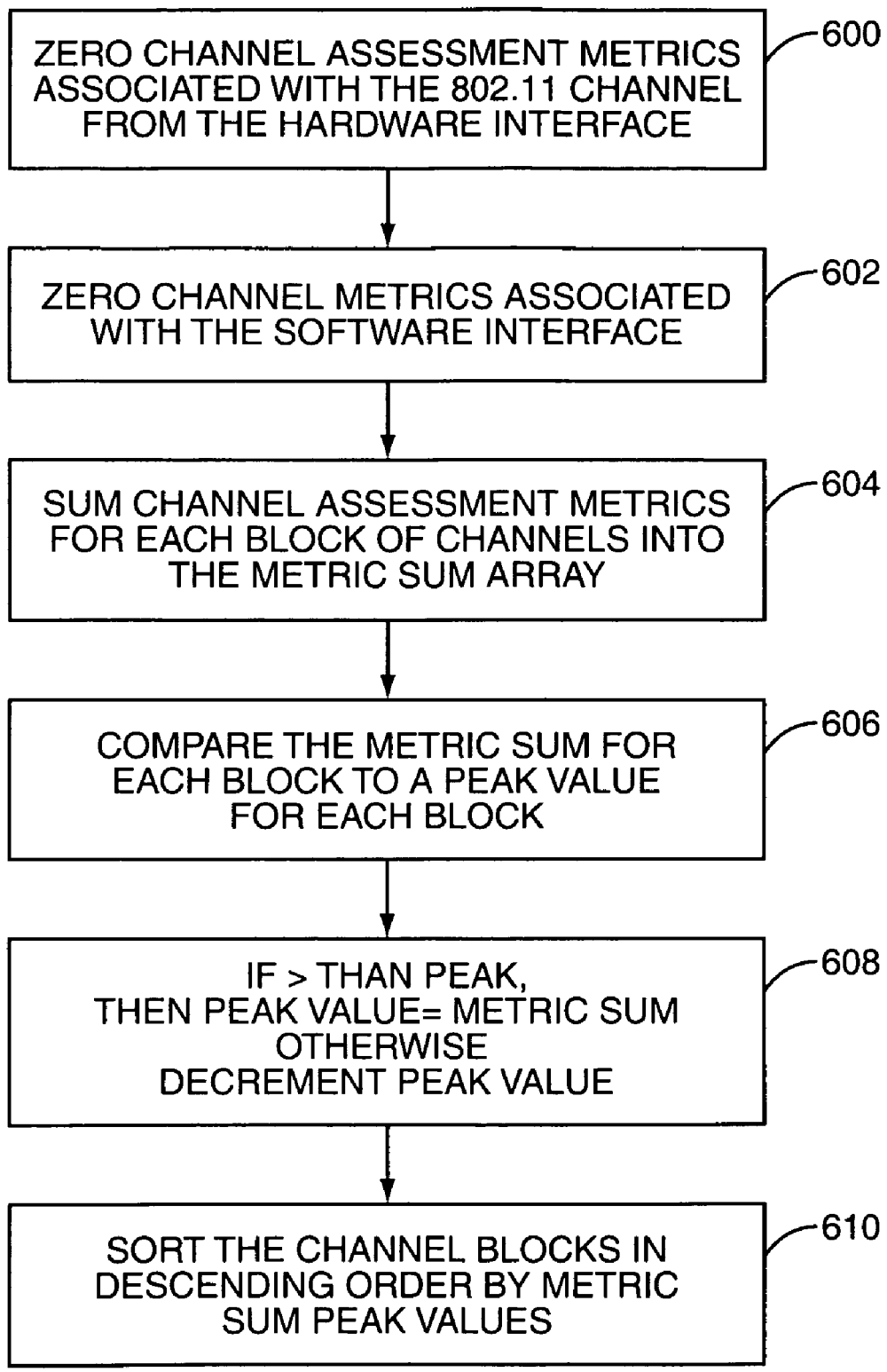
FIG. 6 is a flow chart illustrating the operation of the interference shape detection block of the data analysis engine of FIG. 4 according to one embodiment of the present invention.

FIG. 6 is a flow chart illustrating one embodiment of the operation of the interference shape detection stage 404 of FIG. 4. The prior art techniques block out each and every channel detected as having interference. However, these prior art approaches are disadvantageous because they do not necessarily block out all of the channels that may interfere with the Bluetooth device, nor may they necessarily block out all of the channels that can cause interference to another device (such as an 802.11 device). Therefore, obtaining an accurate picture of which channels are bad has tremendous value. The present method and apparatus not only detects the presence of interference in a channel, it also identifies the bandwidth (or "shape") of the interference.

As illustrated, the channel assessment metrics associated with hardware interface are zeroed (step 600), and the channel assessment metrics associated with the software interface are zeroed (step 602) so that a hangover timer is not applied. In doing so, the hangover timer is not applied to the channels classified as bad by the hardware and software interfaces. As discussed in more detail below, because the hangover timer is designed to help detect unknown, bursty interference, it is not applied to known bad channels as determined by a hardware interface, software interface, or, optionally, channel classification reports received from a slave device.

Next, the channels used by the Bluetooth device 12 are grouped into blocks of channels, where the number of blocks may be 4. More specifically, in this embodiment, the channel metrics for the channels in each block of channels are summed and stored in a metric sum array (metric_sum_array[ ]) (step 604). Thus, the sum of the channel metrics for the first four channels is stored as the first element in the metric sum array, the sum of the channel metrics for the second four channels is stored as second element in the metric sum array, etc. Next, for each block, the metric sum is compared to a peak value (step 606). At this point, the peak value is a previous peak metric value for the block. For each block, if the metric sum is greater than the peak value, then the peak value is set equal to the metric sum (step 608). If the metric sum is not greater than the peak value, then a predetermined decay value is subtracted from the peak value, thereby decaying the peak value (step 608). For this disclosure, the peak values are stored in a metric sum peak array (metric_sum_peak[ ]). Then, the blocks are sorted in descending order from the block having the greatest interference to the least interference based on the peak values (step 610). As a result, the metric sum peak array is sorted. In addition, an index array (index_array[ ]) is generated where the first element of the index array is the block number corresponding to the worst block (the block having the largest metric sum peak value), the second element of the index array is the block number corresponding to the next worst block (the block having the second largest metric sum peak value), etc. It should be noted that the blocks may alternatively be sorted in ascending order. By sorting the blocks, the channels associated with the worst blocks can easily be avoided. It should also be noted that the metric sum peak array ensures that if the interference decreases over time, recent worst case peaks are tracked such that the true worst blocks are determined. This is significant, for example, when the Bluetooth device 12 moves close to a WLAN access point where the metric sum values are large and then away from the WLAN access point where the metric sum values become smaller. Since the WLAN might not be active at the time when the channel metrics are determined, the peak values allow the recent worst case interference for each block to be tracked.

A exemplary pseudo code representation of this process is shown below:

```
UINT8 min_array[NUM_WLAN_CHANNELS] = { 0, 4, 10, 14, 20,
24, 30, 34, 40, 44, 50, 54, 60};
UINT8 max_array[NUM_WLAN_CHANNELS] = {21, 25, 31, 35, 41,
45, 51, 55, 61, 65, 71, 75, 78};
UINT8 chan_block_min_array[NUM_BLOCKS];
UINT8 chan_block_max_array[NUM_BLOCKS];
// Stage 2a: zero out hardware and software interface channels
// (steps 600 and 602)
// Hardware interface (channel "0" indicates no channel)
if(hw_channel != 0)
    for(i=min_array[hw_channel−1];i<=max_array[hw_channel−1];i++)
        channel_assessment_metrics[i] = 0;
// Software interface
for(i=0;i<MAX_CHANNELS;i++)
{
    if(Host_Classficiation[i] == BAD)
        channel_assessment_metrics[i] = 0;
}
// Stage 2b: Find the worst Bluetooth channels (in channel
//blocks)
// (step 604)
for(i=0;i<NUM_BLOCKS;i++)
{
chan_block_min_array[i] = i*BLOCK_SIZE;
chan_block_max_array[i] = (i*BLOCK_SIZE) + (BLOCK_SIZE−1);
    if(chan_block_max_array[i] > MAX_CHANNELS−1)
        chan_block_max_array[i] = MAX_CHANNELS−1;
}
for(i=0;i<NUM_BLOCKS;i++)
{
    metric_sum[i] = 0;
    index_array[i] = i;
    for(j=chan_block_min_array[i];j<=chan_block_max_array[i];j++)
        metric_sum[i] += channel_assessment_metrics[j];
}
```

-continued

```
// Check to see if the metric_sum is a new peak. If so, store the value.
// If not, decrement the value by a decay value.
// Steps 606 and 608
for(i=0;i<NUM_BLOCKS;i++)
{
   if(metric_sum[i] > metric_sum_peak[i])
      metric_sum_peak[i] = metric_sum[i];
   else
   {
      if(metric_sum_peak[i] >= METRIC_SUM_THRESHOLD +
PEAK_DECAY_VALUE)
         metric_sum_peak[i] -= PEAK_DECAY_VALUE;
      else
         metric_sum_peak[i] = METRIC_SUM_THRESHOLD;
   }
}
// Sort the elements using bubble sort - This could be any kind
//of sort routine.
//The worst block will end up at NUM_BLOCKS-
//1, the second at //NUM_BLOCKS-2, etc.
//step 610
for (i=0;i<NUM_BLOCKS-1;i++)
{
   for (j=0;j<NUM_BLOCKS-1-i;j++)
   {
      if (metric_sum_peak[j+1] < metric_sum_peak[j])
      {
         tmp        = metric_sum_peak[j];
         metric_sum_peak[j] = metric_sum_peak[j+1];
         metric_sum_peak[j+1] = tmp;
         tmp        = index_array[j];
         index_array[j] = index_array[j+1];
         index_array[j+1] = tmp;
      }
   }
}
```

Stage 3: Interference Versus Time

As shown in FIG. 4, after the Interference Shape Detection stage 404, the detected interference is input to the Interference versus Time processing stage 406. The interference versus time processing stage 406 analyzes the detected interference over a period of time. This processing block refines the estimate of the center of the interference from a worst block of channels to a channel of the center frequency and leads to more accurate interference estimates. This is particularly valuable in applications where channels are at a premium and must be blocked out intelligently.

Fast Attack—Slow Decay

Analyzing the detected interference over a period of time enhances the quality of metrics measured during periods when the duty cycle of the interference is low and the interference is bursty. Many "static" interferers are not always on. Rather, many static interferers pulse on and off based on traffic. In an 801.11 network, for example, devices are frequently idle. This is particularly the case if the interferer is being used for surfing the Internet. When a user clicks on a web page or attempts to move a file to and from the network, a burst of activity occurs. In these applications wherein network traffic is bursty, it is important that the channel assessment process does not lag significantly. Therefore, in one embodiment, the present inventive methods quickly lock onto an interferer, and avoid those channels even after the interferer has disappeared or has reduced to a very low duty cycle. The channel assessment algorithm removes bad channels quickly and then locks onto the channels for some period of time after the interference is last detected on the channel. This is referred to herein as "fast attack" and "slow decay." This feature significantly aids in maintaining an accurate picture of the total interference even when it is not always present on the channel.

As noted above, when the data analysis engine 32 is used to provide the channel map for AFH, it is not especially important to quickly reuse channels because a device using AFH is still able to obtain full throughput. However, when a device uses channel avoidance, it has reduced throughput during time periods when interference is detected. Therefore, in this case, it is desirable to resume using "bad" channels more quickly. However, the reuse of channels should not be so fast that every time an 802.11 burst occurs, all channels are in use.

In general, when the metric sum for a channel block exceeds a defined threshold, the channel block is determined to be bad, and a timer is started with a selected hangover value (Hangover Slots). In one embodiment, the selected hangover value is the number of Bluetooth timeslots (625 microseconds in duration) that must occur before previously classified "bad" channels may be reclassified as "good" (i.e., reintroduced). In one embodiment, the timer comprises a countdown timer. In one embodiment, each element used to index the timer corresponds to a channel block. The hangover value determines the amount of time that an 802.11 channel is avoided. In one embodiment, the hangover value is configurable. However, because this value determines the amount of time an 802.11 channel is avoided, it is desirable that this value be sufficiently large so as to keep the channel map stable during AFH. However, the hangover value should also be sufficiently small (i.e., result in a sufficiently short time interval) so as to keep bandwidth high during Channel Avoidance.

In one exemplary embodiment, the "hangover" timers are used to increase the reliability of the present channel assessment method and apparatus in detecting low duty cycle interferers on a channel (for example, in detecting low duty cycle interferers such as an 802.11 device being used to "surf" the Internet). The hangover timers determine a period of time after detecting interference on a channel that the process waits before reintroducing the channel (as a good channel) into the channel map. Stated differently, the hangover timers dictate how long previously obtained channel metrics are maintained for a channel before the channel is allowed to be declared "good" (i.e., available for use) again. If an insufficient number of samples were obtained during the previous measurement period, the hangover timers should be extended by at least one channel classification interval to prevent the blind re-introduction of channels. Any AFH or avoidance hangover timer that has not already expired is extended.

FIG. 7A is an exemplary flow chart illustrating the operation of the interference versus time processing stage 404 (FIG. 4) in characterizing the channel blocks for AFH. First, a value corresponding to a total number of blocks avoided for AFH (blocks_avoided_AFH) and a block index value (blocks) are initialized to zero (step 700A). The incorporated Bluetooth Specification requires at least 20 channels to be in the AFH channel map in order to comply with worldwide regulatory requirements. An absolute maximum number of channels that may be marked as "bad" in the AFH channel map is therefore 59 when the total number of channels is 79. Thus, if the channels are grouped in blocks of four adjacent channels, an absolute maximum number of channel blocks to avoid for AFH is 15. The maximum number of channel blocks to avoid for AFH (MAX_AFH) is less than or equal to the absolute maximum number of channel blocks to avoid for AFH.

Steps 702A-710A are repeated for the MAX_AFH worst blocks, where MAX_AFH is the maximum number of channel blocks to avoid for AFH. More specifically, for the first iteration, if the index value (blocks) is greater than or equal to the maximum blocks to avoid for AFH (MAX_AFH), then the process ends (step 702A). If the index value (blocks) is less than the maximum blocks to avoid for AFH (MAX_AFH), then the metric sum corresponding to the worst channel block (metric sum[NUM_BLOCKS—blocks −1], where blocks=0) is compared to a metric sum threshold value (step 704A). If the metric sum is less than the metric sum threshold value, then the block index value is incremented and the process returns to step 702A. If the metric sum is greater than or equal to the metric sum threshold value, then the number of blocks currently avoided is compared to the maximum number of blocks to avoid for AFH (step 706A). If the current number of blocks avoided for AFH (blocks_avoided_AFH) is greater than the maximum number of blocks to avoid for AFH (MAX_AFH), then the block index (block) is incremented and the process returns to step 702A or alternatively ended. If the number of blocks currently avoided for AFH (blocks_avoided_AFH) is less than the maximum number of blocks to avoid for AFH (MAX_AFH), then the number of blocks avoided for AFH (blocks_avoided_AFH) and the block index value (blocks) are incremented (step 708A), a hangover timer corresponding to the worst block is set to a maximum value (step 710A), and the process returns to step 702A. The maximum value of the hangover timer corresponds to a desired amount of time that must expire from the time a channel is classified as "bad" until it may be classified as "good." Steps 702A-710A are repeated for the MAX_AFH worst blocks (metric_sum[NUM_BLOCKS—blocks −1], where blocks=0 . . . MAX_AFH-1).

In essence, the process shown in FIG. 7A compares the metric sum of the worst MAX_AFH channel blocks to the metric sum threshold value. If the metric sum is greater than or equal to the metric sum threshold value, the corresponding hangover timer for AFH is increased. If the metric sum is less than the metric sum threshold value, the metric sum is ignored.

FIG. 7B is an exemplary flow chart illustrating the operation of the interference versus time stage 404 in characterizing the channel blocks for channel avoidance. FIG. 7B is essentially the same as FIG. 7A. However, in step 702B, the block index value (blocks) is compared to a maximum number of blocks to avoid for channel avoidance (MAX_AVOID). In the case of channel avoidance, fewer channels are blocked out because every channel removed reduces the maximum Bluetooth throughput. In one embodiment, the maximum number of channels blocked out by the channel avoidance algorithm is 24. If each block includes four channels, an absolute maximum number of blocks to avoid for channel avoidance is 6. The maximum number of channels to avoid for channel avoidance (MAX_AVOID) is less than or equal to the absolute maximum number of blocks to avoid for channel avoidance.

In essence, the process shown in FIG. 7B compares the metric sum of the worst MAX_AVOID channel blocks to the metric sum threshold value, where MAX_AVOID is the maximum number of blocks to avoid for channel avoidance. The metric sum threshold value may or may not be the same for AFH and channel avoidance. If the metric sum is greater than or equal to the metric sum threshold value, the corresponding hangover timer for channel avoidance is increased. If the metric sum is less than the metric sum threshold value, the metric sum is ignored.

The following pseudo-code shows an exemplary implementation of the processes of FIGS. 7A and 7B.

```
// Stage 3a: Check each N channel block and see whether it is
// above the threshold. If so, extend the hangover timer and
// block out the channels as bad.
for(i=0;1<MAX_AFH;i++)
{
   if(metric_sum[index_array[NUM_BLOCKS-i-1]] >=
METRIC_SUM_THRESHOLD)
      T_hangover_afh[index_array[NUM_BLOCKS-i-1]] =
      now + HANGOVER;
}
for(i=0;i<MAX_AVOID;i++)
{
   if(metric_sum[index_array[NUM_BLOCKS-i-1]] >=
METRIC_SUM_THRESHOLD)
      T_hangover_avoidance[index_array[NUM_BLOCKS-i-1]] =
now + HANGOVER;
}
```

In one embodiment of the present invention, the interference versus time stage 406 (FIG. 4) also filters the channel block having the highest metric sum peak value in order to accurately identify center frequency. During the interference shape detection stage 404, an estimate of the center frequency, and thus the shape of the interference, is determined by locating the channel block having the highest metric sum peak. However, the interference versus time stage 406 filters the channel block having the highest metric sum peak value in order to accurately identify the center frequency of the interference. This embodiment is especially useful in applications where coexistence of Bluetooth devices with devices that do not support AFH is required. In these applications, Bluetooth devices utilizing a channel avoidance scheme should refrain from transmitting low priority information on channels marked as unused by the channel classification algorithm. High priority information, such as transmissions to human interface devices (e.g., mice, keyboards, etc.) for audio packets, or to maintain piconet stability, is transmitted in spite of potential collisions with 802.11 transmissions. Pseudo code showing one possible implementation of a filter for accurately determining the channel assessment center frequency (CA_center_chan) by calculating the channel corresponding to the center frequency of the interference is shown below:

```
// Stage 3b: Filter the peak metric_sum_peak[ ] value to find
// center of the center lobe of 802.11. This filter uses
// a lossy integrator. Note, the multiply by "4" below is
// because each channel block is 4 MHz wide.
//
// The units of CA_center_chan are in Bluetooth channel
// numbers (e.g. between 0 and 78)
CA_center_chan = (index_array[NUM_BLOCKS-1] * 4 *
(ALPHA-BETA)/ALPHA)
         + (CA_center_chan * BETA / ALPHA);
```

It should be noted that ALPHA and BETA are predetermined parameters for the lossy integrator. In one embodiment, ALPHA is 8 and BETA is 1. It should be noted that the lossy integrator is an exemplary method of calculating the center frequency of the interference. Other techniques will be apparent to one of ordinary skill in the art upon reading this disclosure.

Stage 4: Combining Metrics

The last step in the present inventive method and apparatus is the step of combining metrics. This step is shown in FIG. 4 as the metric combiner stage 408. In one embodiment, it is important to perform this step last. If the software and hardware lists of good and bad channels were added before steps 402-406, it would mask the true interference picture and lead to erroneous results. Therefore, it is important that this combination of external information is performed last in the processing steps.

The output of the Metric Combiner stage 408 on a master device is the channel map for AFH and/or the channel map for channel avoidance. On slave devices, the output is a Channel Classification parameter (remote metric) communicated to an associated master device and used by the master device for channel classification. Channel classification is accomplished by evaluating all of the information available to the master device. This information includes one or more of the following: hangover timers for the channel blocks for AFH and/or channel avoidance, channel information from the host 16 via the software interface 22, the Channel Classification parameter from one or more slave devices, and channel information from the wireless device 14 via the hardware interface 18.

In some embodiments, the host 16 informs the Bluetooth device 12 whether a Bluetooth channel is "bad" or "unknown." In one embodiment, the host 16 may not set fewer than 20 Bluetooth channels to an "unknown" state. The wireless device 14 may be a collocated 802.11 device that communicates a current 802.11 channel number. The number of Bluetooth channels to be identified as bad is determined by a lookup table based on the 801.11 channel number. In one exemplary embodiment, the slave device can report channel classification results to the master using the AFH_Channel_Classification parameter in the LMP_channel_classification packet data unit (PDU), which is described in the Bluetooth Specification. In this PDU, channels are classified in pairs (e.g., channel 0 and 1 are classified together, channels 2 and 3 are classified together, and so on, up to channel 78 (which is classified alone)). Slaves may classify a channel as "good", "bad" or "unknown."

FIG. 8A illustrates the operation of the metric combiner stage 408 for AFH. First, the channels of the Bluetooth device 12 corresponding to the 802.11 channel used by the wireless device 14 (FIG. 1) are marked as "unused" (800A). Next, the channels labeled as "unused" in the channel information from the host 16 are marked as "unused" (step 802A). It should be noted that since the host 16 and the wireless device 14 are optional devices, steps 800A and 802A are also optional. Next, the channels associated with the channel blocks whose hangover timers are not expired are marked as "unused" for AFH (step 804A). Finally, if there are one or more slave devices reporting to the master device, the channels marked as bad in the slave channel classification are marked as "unused" (step 806A).

FIG. 8B illustrates the operation of the metric combiner stage 408 for channel avoidance. First, the channels of the Bluetooth device 12 corresponding to the 802.11 channel used by the wireless device 14 (FIG. 1) are marked as "unused" (800B). Next, the channels labeled as "unused" in the channel information from the host 16 are marked as "unused" (step 802B). It should be noted that since the host 16 and the wireless device 14 are optional devices, steps 800B and 802B are also optional. Next, the channels within the frequency range of the center frequency of the interference determined above plus and minus a predetermined half bandwidth (Nb) are marked as "unused" for AFH (step 804B). Then, if there are one or more slave devices reporting to the master device, the channels marked as bad in the slave channel classification are marked as "unused" (step 806B). Optionally, if more channels can be avoided, additional channels may be marked as "unused" in an additional step similar to step 804A of FIG. 8A.

The pseudo-code below shows an exemplary implementation of the processes of FIGS. 8A and 8B. As shown in the pseudo-code below, the master device channel classification process includes a loop over 79 channels and consolidates results obtained from a local classification, host classification, and slave classifications. The master device maintains at least 20 used channels. In this exemplary embodiment, two different channel maps are produced: AFH_channel_map[] and avoidance_channel_map[]. As noted above, AFH can use fewer Bluetooth channels than the channel avoidance techniques because AFH does not lose bandwidth as the number of channels decrease.

```
// Stage 4a: Metric combining
// Initialize the number of used channels for AFH and avoidance
// to 0
AFH_unused_count       = 0;
avoidance_unused_count = 0;
// Block out the hardware and software interface channels
//marked as bad
for(i=0;i<MAX_CHANNELS;i++)
{
  // Default all channels to used
  AFH_channel_map[!]       = USED_CLASSIFICATION;
  avoidance_channel_map[!] = USED_CLASSIFICATION;
  // Set channels to unused if they are marked as bad by the
  // hardware interface or the host
            if( (Host_Classficiation[i] == BAD) || HW_Classification[i]   == BAD) )
            {
              if(AFH_unused_count <= MAX_CHANNELS - N_MIN)
              {
                AFH_channel_map[i]    = UNUSED_CLASSIFICATION;
                AFH_unused_count      += 1;
              }
            }
}
// The local metrics are classified for AFH
for(i=0;i<NUM_BLOCKS;i++)
{
```

```
        if(T_hangover_afh[i] != −1)
        {
            // Mark the channels as bad for each block that is above
            // the threshold
            for(j=chan_block_min_array[i];j<=chan_block_max_array[i];j++)
            {
                if(AFH_unused_count <= MAX_CHANNELS − N_MIN)
                {
                    AFH_channel_map[j] = UNUSED_CLASSIFICATION;
                    AFH_unused_count  += 1;
                }
            }
        }
    }
    // The local metrics are classified for Avoidance
    if(T_hangover_avoidance[index_array[CA_center_chan/4]] != −1)
    {
        // Mark the channels as bad for each channel within
        // CA_center_chan +/− Nb
        if(CA_center_chan − NB < 0)
            temp_low = 0;
        else
            temp_low = CA_center_chan − NB;
        if(CA_center_chan + NB > MAX_CHANNELS−1)
            temp_high = MAX_CHANNELS−1;
        else
            temp_high = CA_center_chan + NB;
        for(i=temp_low;i<=temp_high;i++)
        {
            if(avoidance_unused_count<=MAX_CHANNELS−N_MIN_AVOIDANCE)
            {
                avoidance_channel_map[i] = UNUSED_CLASSIFICATION;
                avoidance_unused_count  += 1;
            }
        }
    }
    // Finally, if the device is a master the slave metrics are
    // combined with the rest of the classification results as long
    // as the unused_count isn't too large
    if(device == MASTER)
    {
        for(i=0;i<MAX_CHANNELS;i++)
        {
            // Initialization
            Slave_Classification[i] = UNKNOWN;
            // Combine the slave classification results
            for(j=0;j<NUMBER_OF_SLAVE_RESULTS;j++)
            {
                if(Slave_Classficiation_Result[j][i] == BAD)
                    Slave_Classification[i] = BAD;
                else if (Slave_Classification_Result[j][i] == GOOD)
                    Slave_Classification[i] = GOOD;
            }
            if(Slave_Classification[i] == BAD)
            {
                if(AFH_unused_count <= MAX_CHANNELS − N_MIN)
                {
                    AFH_channel_map[i]   = UNUSED;
                    AFH_unused_count    += 1;
                }
                if(avoidance_unused_count<=MAX_CHANNELS−N_MIN_AVOIDANCE)
                {
                    avoidance_channel_map[i] = UNUSED;
                    avoidance_unused_count += 1;
                }
            }
        }
    }
}
```

In one embodiment, for the master device, an array of channels, i.e., "AFH_channel_map[i]", is converted into the Channel_Map format, which is described in the Bluetooth specification. For a slave device, the array of channels AFH_channel_map[i] is converted into a channel classification report. The channel classification report can be transmitted in the LMP_channel_classification PDU. In both a master and slave, the avoidance_channel_map[] is used only for purposes of performing channel avoidance.

Slave Channel Classification Reporting

In one embodiment, when channel classification reporting is enabled, a slave device combines the results of the metric combiner stage 408 into a channel classification report in the format of the LMP_channel_classification PDU, where the format of the LMP_channel_classification PDU is described in the Bluetooth Specification. In one embodiment, the channels are combined into channel pairs. When either channel in the channel pair is identified as "bad," the pair is marked as "bad." When either channel in a channel pair is identified as "good" the pair is marked as "good," (this inquiry should be performed after the inquiry for a "bad" channel). Otherwise, the channel pair is identified as "unknown."

One exemplary implementation of channel classification reporting by a slave device is shown in the pseudo code below:

```
// Stage 4b: Slave classification reporting
// Loop through all 40 channel pairs
for(i=0;i<MAX_CHANNEL_PAIRS-1;i++)
{
    // Compute the local classification
    if((AFH_channel_map[2*i] == BAD) ||
        (AFH_channel_map[2*i+1] == BAD))
        channel_report[i] = BAD;
    else if((AFH_channel_map[2*i] == GOOD) ||
        (AFH_channel_map[2*i+1] == GOOD))
        channel_report[i] = GOOD;
    else
        channel_report[i] = UNKNOWN;
}
channel_report[MAX_CHANNEL_PAIRS-1] =
    AFH_channel_map[MAX_CHANNEL_PAIRS-1];
```

Hangover Timer Expiry

In one exemplary embodiment, when a hangover timer (T_hangover_afh[i] or T_hangover_avoidance[i]) times out, the channels that are currently avoided because of an associated channel block are returned to the pool of channels available for use. It should be noted that hangover timer expiry may be performed at various stages during the channel classification described above. In one embodiment, hangover timer expiry is performed at the beginning of the process before either the frequency hopped interference filtering stage 402 or the Interference Shape Detection block 404. However, in an alternative embodiment, the hangover timer expiry may be performed at the end of the channel classification after the Metric Combiner block 408.

One exemplary embodiment of the hangover timer expiry is given in the pseudo code below:

```
// Hangover Timer Expiry
for(i=0;i<NUM_BLOCKS;i++)
{
    if(T_hangover_afh[i] < now)
        T_hangover_afh[i] = -1;
    if(T_hangover_avoidance[i] < now)
        T_hangover_avoidance[i] = -1;
}
```

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

In addition, although examples of the present invention have been described in the context of Bluetooth devices, the present invention can be used to implement any device that uses point-to-point and point-to-multipoint connections.

Those skilled in the art will recognize improvements and modifications to the preferred embodiments of the present invention. All such improvements and modifications are considered within the scope of the concepts disclosed herein and the claims that follow.

What is claimed is:

1. A method of assessing channels in a wireless communication system comprising:
   obtaining channel metrics for each of a plurality of channels in the wireless communication system, wherein the channel metrics include information representative of interference signals in the plurality of channels;
   filtering the channel metrics to remove metrics associated with frequency hopped interference to provide filtered channel metrics representative of frequency static interference;
   determining a shape of the frequency static interference based on the filtered channel metrics by
     (i) dividing the plurality of channels into a plurality of channel blocks, each channel block comprising at least two adjacent channels; and
     (ii) for each of the plurality of channel blocks, combining the filtered channel metrics of the at least two adjacent channels comprised in the channel block, thereby providing a combined metric for each of the plurality of channel blocks; and
   classifying each of the plurality of channels based on the combined metrics, thereby identifying usable and unusable channels.

2. The method of claim 1, wherein determining the shape of the frequency static interference further comprises:
   finding a number (N) of the plurality of channel blocks having the worst interference based on the combined metrics of the plurality of channel blocks, wherein N is a predetermined maximum number of channel blocks that are to be classified as unusable.

3. The method of claim 2 wherein finding the number (N) of the plurality of channel blocks having the worst interference comprises:
   for each of the plurality of channel blocks:
     comparing the combined metric of the respective channel block to a previous value of a metric sum peak for the channel block;
     if the combined metric is greater than the previous value of the metric sum peak, setting the metric sum peak equal to the combined metric; and
     if the combined metric is less than the previous value of the metric sum peak, decrementing the previous value of the metric sum peak by a predetermined value to update the metric sum peak; and
   finding the number (N) of the plurality of channel blocks having the worst interference by finding the number (N) of the plurality of channel blocks having largest ones of the metric sum peak values.

4. The method of claim 2 wherein classifying each of the plurality of channels comprises:
   comparing the combined metric for each of the number (N) of the plurality of channel blocks to a predetermined combined metric threshold value.

5. The method of claim 4 wherein classifying each of the plurality of channels further comprises, for each of the number (N) of the plurality of channel blocks, setting a corresponding hangover timer to a predetermined hangover value if the combined metric for the channel block is greater than the predetermined combined metric threshold value.

6. The method of claim 5 wherein classifying each of the plurality of channels comprises classifying each of the plurality of channels comprised in a plurality of channel blocks based on the corresponding hangover timers for each of the plurality of channel blocks.

7. The method of claim 6 wherein classifying each of the plurality of channels based on the corresponding hangover timers comprises:
classifying channels within each of the number (N) of the plurality of channel blocks corresponding to unexpired hangover timers as unusable; and
classifying channels within each of the number (N) of the plurality of channel blocks corresponding to expired hangover timers as usable.

8. The method of claim 7 wherein classifying each of the plurality of channels further comprises classifying channels within ones of the plurality of channel blocks other than the number (N) of the plurality of channel blocks as usable.

9. The method of claim 1 wherein classifying each of the plurality of channels is further based on remote metrics from one or more external devices.

10. The method of claim 1 wherein determining the shape of the frequency static interference further comprises:
finding a channel block of the plurality of channel blocks that corresponds to a center frequency of the frequency static interference based on the combined metrics for the plurality of channel blocks; and
classifying each of the plurality of channels comprises:
determining, within the channel block of the plurality of channel blocks that corresponds to the center frequency of the frequency static interference, a channel of the plurality of channels that corresponds to the center frequency of the frequency static interference; and
classifying a number of the plurality of channels within a predetermined bandwidth from the frequency of the determined channel of the plurality of channels that corresponds to the center frequency of the frequency static interference as unusable.

11. The method of claim 10 wherein finding the channel block of the plurality of channel blocks that corresponds to the center frequency of the frequency static interference comprises:
for each of the plurality of channel blocks:
comparing the combined metric of the respective channel block to a previous value of a metric sum peak for the channel block;
if the combined metric is greater than the previous value of the metric sum peak, setting the metric sum peak equal to the combined metric; and
if the combined metric is less than the previous value of the metric sum peak, decrementing the previous value of the metric sum peak by a predetermined value to update the metric sum peak; and
finding the channel block of the plurality of channel blocks that corresponds to the center frequency of the frequency static interference by finding a one of the plurality of channel blocks having a largest one of the metric sum peaks.

12. The method of claim 11 wherein processing the channel block of the plurality of channel blocks that corresponds to the center frequency of the frequency static interference comprises filtering the channel block of the plurality of channel blocks that corresponds to the center frequency of the frequency static interference to determine a channel of the plurality of channels that corresponds to the center frequency of the frequency static interference.

13. The method of claim 10 wherein the predetermined bandwidth is approximately equal to 22 MHz.

14. The method of claim 1 wherein obtaining the channel metrics for each of the plurality of channels comprises:
initializing the channel metric for each of the plurality of channels;
collecting data representative of the interference for each of the plurality of channels;
for each of the plurality of channels, comparing the data to a series of thresholds;
for each of the plurality of channels, combining a previous value of the channel metric and a value corresponding to a largest one of the series of thresholds that the data for the channel exceeds to update the channel metric; and
repeating the collecting, comparing, and combining steps until a predetermined number of iterations are performed.

15. The method of claim 1 further comprising periodically initiating the step of obtaining the channel metrics.

16. The method of claim 1 wherein obtaining the channel metrics is initiated upon detecting a packet-error-rate above a predetermined error threshold.

17. A wireless communication system comprising:
a data collection engine that obtains channel metrics for each of a plurality of channels in the wireless communication system, wherein the channel metrics include information representative of interference signals in the plurality of channels; and
a data analysis engine that:
filters the channel metrics to remove metrics associated with frequency hopped interference to provide filtered channel metrics representative of frequency static interference;
divides the plurality of channels into a plurality of channel blocks, each channel block comprising at least two adjacent channels;
for each of the plurality of channel blocks, combines the filtered channel metrics of the at least two adjacent channels comprised in the channel block to provide a combined metric for each of the plurality of channel blocks; and
classifies each of the plurality of channels based on the combined metrics, thereby identifying usable and unusable channels.

18. The system of claim 17 wherein the data analysis engine finds a number (N) of the plurality of channel blocks having the worst interference based on the combined metrics of the plurality of channel blocks, wherein N is a predetermined maximum number of channel blocks that are to be classified as unusable.

19. The system of claim 18 wherein to determine the number (N) of the plurality of channel blocks having the worst interference, the data analysis engine is configured to:
for each of the plurality of channel blocks:
compare the combined metric of the respective channel block to a previous value of a metric sum peak for the channel block;

if the combined metric is greater than the previous value of the metric sum peak, set the metric sum peak equal to the combined metric; and if the combined metric is less than the previous value of the metric sum peak, decrement the previous value of the metric sum peak by a predetermined value to update the metric sum peak; and find the number (N) of the plurality of channel blocks having the worst interference by finding the number (N) of the plurality of channel blocks having largest ones of the metric sum peak values.

20. The system of claim 18 wherein to classify each of the plurality of channels, the data analysis engine is further configured to compare the combined metric for each of the number (N) of the plurality of channel blocks to a predetermined combined metric threshold value.

21. The system of claim 20 wherein to classify each of the plurality of channels, the data analysis engine is further configured to, for each of the number (N) of the plurality of channel blocks, set a corresponding hangover timer to a predetermined hangover value if the combined metric for the channel block is greater than the predetermined combined metric threshold value.

22. The system of claim 21 wherein to classify each of the plurality of channels, the data analysis engine is further configured to classify each of the plurality of channels comprised in a plurality of channel blocks based on the corresponding hangover timers for each of the plurality of channel blocks.

23. The system of claim 22 wherein to classify each of the plurality of channels based on the corresponding hangover timers, the data analysis engine is further configured to:

classify channels within each of the number (N) of the plurality of channel blocks corresponding to unexpired hangover timers as unusable; and classify channels within each of the number (N) of the plurality of channel blocks corresponding to expired hangover timers as usable.

24. The system of claim 23 wherein to classify each of the plurality of channels, the data analysis engine is further configured to classify channels within ones of the plurality of channel blocks other than the number (N) of the plurality of channel blocks as usable.

25. The system of claim 17 wherein to classify each of the plurality of channels, the data analysis engine is further configured to classify each of the plurality of channels based on remote metrics from one or more external devices.

26. The system of claim 17 wherein the data analysis engine is further configured to find a one of the plurality of channel blocks corresponding to a center frequency of the frequency static interference based on the combined metrics for the plurality of channel blocks.

27. The system of claim 26 wherein in order to classify each of the plurality of channels, the data analysis engine is further configured to:

process the one of the plurality of channel blocks corresponding to the center frequency of the frequency static interference to determine, within the channel block of the plurality of channel blocks that corresponds to the center frequency of the frequency static interference, a channel of the plurality of channels corresponding to the center frequency of the frequency static interference; and classify a number of the plurality of channels within a predetermined bandwidth from the frequency of the determined channel of the plurality of channels corresponding to the center frequency of the frequency static interference as unusable.

28. The system of claim 27 wherein to find the one of the plurality of channel blocks corresponding to the center frequency, the data analysis engine is further adapted configured to:

for each of the plurality of channel blocks:

compare the combined metric of the respective channel block to a previous value of a metric sum peak for the channel block;

if the combined metric is greater than the previous value of the metric sum peak, set the metric sum peak equal to the combined metric; and if the combined metric is less than the previous value of the metric sum peak, decrement the previous value of the metric sum peak by a predetermined value to update the metric sum peak; and find the one of the plurality of channel blocks corresponding to the center frequency by finding a one of the plurality of channel blocks having a largest one of the metric sum peaks.

29. The system of claim 28 wherein the data analysis engine processes the one of the plurality of channel blocks corresponding to the center frequency of the frequency static interference by filtering the channel block of the plurality of channel blocks that corresponds to the center frequency of the frequency static interference to determine a channel of the plurality of channels corresponding to the center frequency of the frequency static interference.

30. The system of claim 27 wherein the predetermined bandwidth is approximately equal to 22 MHz.

31. The system of claim 17 wherein to obtain the channel metrics for each of the plurality of channels, the data collection engine is further configured to:

initialize the channel metric for each of the plurality of channels; and repeatedly collect data representative of the interference for each of the plurality of channels, compare the data for each of the plurality of channels to a series of thresholds for each of the plurality of channels, and, for each of the plurality of channels, combine a previous value of the channel metric and a value corresponding to a largest one of the series of thresholds that the data for the channel exceeds to update the channel metric until a predetermined number of iterations are performed.

32. The system of claim 17 wherein the data collection engine is periodically triggered to obtain the channel metrics.

33. The system of claim 17 wherein the data collection engine is triggered to obtain the channel metrics upon detecting a packet-error-rate above a predetermined error threshold.

34. A method of assessing channels in a wireless communication system, the method comprising:

obtaining channel metrics for each of a plurality of channels in the wireless communication system, wherein the channel metrics include information representative of interference signals in the plurality of channels;

determining whether to set a hangover timer to a predetermined hangover value for each of the plurality of channels based on at least one of the channel metrics for the plurality of channels; the determining act comprises filtering the channel metrics to remove metrics associated with frequency hopped interference to provide filtered channel metrics representative of frequency static interference by comparing, for each channel, a number of bad channel metrics of the channel to a threshold; and classifying each of the plurality of channels based on the hangover timer for each of the plurality of channels, thereby identifying usable and unusable channels.

35. The method of claim 34 wherein determining whether to set the hangover timer to the predetermined hangover value for each of the plurality of channels further comprises determining a shape of a frequency static interference based on the filtered channel metrics, determining the shape of the frequency static interference comprising:
- dividing the plurality of channels into a plurality of channel blocks, each channel block comprising at least two adjacent channels; and
- for each of the plurality of channel blocks, combining the channel metrics of the at least two adjacent channels, thereby providing a combined metric for each of the plurality of channel blocks.

36. The method of claim 35 wherein determining whether to set the hangover timer to the predetermined hangover value for each of the plurality of channels is further based on the combined metrics for the plurality of channel blocks.

37. The method of claim 35 wherein determining the shape of the frequency static interference further comprises:
- finding a number (N) of the plurality of channel blocks having the worst interference based on the combined metrics of the plurality of channel blocks, wherein N is a predetermined maximum number of channel blocks that are to be classified as unusable.

38. The method of claim 37 wherein finding the number (N) of the plurality of channel blocks having the worst interference comprises:
- for each of the plurality of channel blocks:
  - comparing the combined metric of the respective channel block to a previous value of a metric sum peak for the channel block;
    - if the combined metric is greater than the previous value of the metric sum peak, setting the metric sum peak equal to the combined metric; and
    - if the combined metric is less than the previous value of the metric sum peak, decrementing the previous value of the metric sum peak by a predetermined value to update the metric sum peak; and
  - finding the number (N) of the plurality of channel blocks having the worst interference by finding a number (N) of the plurality of channel blocks having largest ones of the metric sum peak values.

39. The method of claim 37 wherein classifying each of the plurality of channels comprises:
- comparing the combined metric for each of the number (N) of the plurality of channel blocks to a predetermined combined metric threshold value.

40. The method of claim 39 wherein classifying each of the plurality of channels further comprises, for each of the number (N) of the plurality of channel blocks, setting the hangover timer to the predetermined hangover value if the combined metric for the channel block is greater than the predetermined combined metric threshold value.

41. The method of claim 40 wherein classifying each of the plurality of channels further comprises:
- classifying channels within each of the number (N) of the plurality of channel blocks corresponding to unexpired hangover timers as unusable; and
- classifying channels within each of the number (N) of the plurality of channel blocks corresponding to expired hangover timers as usable.

42. A system for assessing channels in a wireless communication environment, the system comprising:
- a data collection engine configured to obtains channel metrics for each of a plurality of channels in the wireless communication system, wherein the channel metrics include information representative of interference signals in the plurality of channels; and
- a data analysis engine configured to:
  - determine whether to set a hangover timer to a predetermined hangover value for each of the plurality of channels based on at least one of the channel metrics for the plurality of channels; the determining comprising filtering the channel metrics to remove metrics associated with frequency hopped interference to provide filtered channel metrics representative of frequency static interference by comparing, for each channel, a number of bad channel metrics of the channel to a threshold; and
  - classify each of the plurality of channels based on the hangover timer for each of the plurality of channels, thereby identifying usable and unusable channels.

43. The system of claim 42 wherein to determine whether to set the hangover timer to the predetermined hangover value for each of the plurality of channels, the data analysis engine is further configured to:
- divide the plurality of channels into a plurality of channel blocks, each channel block comprising at least two adjacent channels; and
- for each of the plurality of channel blocks, combine the channel metrics of the at least two adjacent channels, thereby providing a combined metric for each of the plurality of channel blocks.

44. The system of claim 43 wherein the data analysis engine is further configured to determine whether to set the hangover timer to the predetermined hangover value for each of the plurality of channels based on the combined metrics for the plurality of channel blocks.

45. The system of claim 43 wherein to determine whether to set the hangover timer to the predetermined hangover value for each of the plurality of channels, the data analysis engine is further configured to find a number (N) of the plurality of channel blocks having the worst interference based on the combined metrics of the plurality of channel blocks, wherein N is a predetermined maximum number of channel blocks that are to be classified as unusable.

46. The system of claim 45 wherein to find the number (N) of the plurality of channel blocks having the worst interference, the data analysis engine is further configured to:
- for each of the plurality of channel blocks:
  - compare the combined metric of the respective channel block to a previous value of a metric sum peak for the channel block;
    - if the combined metric is greater than the previous value of the metric sum peak, set the metric sum peak equal to the combined metric; and
    - if the combined metric is less than the previous value of the metric sum peak, decrement the previous value of the metric sum peak by a predetermined value to update the metric sum peak; and
  - find the number (N) of the plurality of channel blocks having the worst interference by finding a number (N) of the plurality of channel blocks having largest ones of the metric sum peak values.

47. The system of claim 45 wherein to classify each of the plurality of channels, the data analysis engine is further configured to compare the combined metric for each of the number (N) of the plurality of channel blocks to a predetermined combined metric threshold value.

48. The system of claim 47 wherein to classify each of the plurality of channels, the data analysis engine is further configured to, for each of the number (N) of the plurality of channel blocks, set the hangover timer to the predetermined hangover value if the combined metric for the channel block is greater than the predetermined combined metric threshold value.

49. The system of claim 48 wherein to classify each of the plurality of channels, the data analysis engine is further configured to:
   classify channels within each of the number (N) of the plurality of channel blocks corresponding to unexpired hangover timers as unusable; and
   classify channels within each of the number (N) of the plurality of channel blocks corresponding to expired hangover timers as usable.

50. A system for assessing channels in a wireless communication system comprising:
   means for obtaining channel metrics for each of a plurality of channels in the wireless communication system, wherein the channel metrics include information representative of interference signals in the plurality of channels;
   means for determining whether to set a hangover timer to a predetermined hangover value for each of the plurality of channels based on at least one of the channel metrics for the plurality of channels; the determining act comprises filtering the channel metrics to remove metrics associated with frequency hopped interference to provide filtered channel metrics representative of frequency static interference by comparing, for each channel, a number of bad channel metrics of the channel to a threshold; and
   means for classifying each of the plurality of channels based on the hangover timer for each of the plurality of channels, thereby identifying usable and unusable channels.

51. A computer-readable medium having instructions stored thereon, the instructions, when executed by a processor, for causing the processor to execute the steps of:
   obtaining channel metrics for each of a plurality of channels in the wireless communication system, wherein the channel metrics include information representative of interference signals in the plurality of channels;
   determining whether to set a hangover timer to a predetermined hangover value for each of the plurality of channels based on at least one of the channel metrics for the plurality of channels; the determining act comprises filtering the channel metrics to remove metrics associated with frequency hopped interference to provide filtered channel metrics representative of frequency static interference by comparing, for each channel, a number of bad channel metrics of the channel to a threshold; and
   classifying each of the plurality of channels based on the hangover timer for each of the plurality of channels, thereby identifying usable and unusable channels.

* * * * *